United States Patent
Wang et al.

(10) Patent No.: US 9,332,259 B2
(45) Date of Patent: May 3, 2016

(54) INDICATION OF USE OF WAVEFRONT PARALLEL PROCESSING IN VIDEO CODING

(71) Applicant: Qualcomm Incorporated, San Diego, CA (US)

(72) Inventors: Ye-Kui Wang, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 568 days.

(21) Appl. No.: 13/718,883

(22) Filed: Dec. 18, 2012

(65) Prior Publication Data

US 2013/0182774 A1 Jul. 18, 2013

Related U.S. Application Data

(60) Provisional application No. 61/588,096, filed on Jan. 18, 2012.

(51) Int. Cl.
*H04N 19/90* (2014.01)
*H04N 19/46* (2014.01)
*H04N 19/463* (2014.01)
*H04N 19/436* (2014.01)

(52) U.S. Cl.
CPC ....... *H04N 19/00945* (2013.01); *H04N 19/436* (2014.11); *H04N 19/46* (2014.11); *H04N 19/463* (2014.11); *H04N 19/90* (2014.11)

(58) Field of Classification Search
None
See application file for complete search history.

(56) References Cited

U.S. PATENT DOCUMENTS

| | | | |
|---|---|---|---|
| 2008/0037656 A1 | 2/2008 | Hannuksela | |
| 2009/0003447 A1 | 1/2009 | Christoffersen et al. | |
| 2010/0046635 A1 | 2/2010 | Pandit et al. | |
| 2011/0280314 A1 | 11/2011 | Sankaran et al. | |
| 2012/0082218 A1 | 4/2012 | Misra et al. | |
| 2012/0086587 A1* | 4/2012 | Sze | H03M 7/4018 341/107 |
| 2012/0183074 A1* | 7/2012 | Fuldseth | 375/240.24 |
| 2012/0230428 A1 | 9/2012 | Segall et al. | |
| 2013/0182775 A1 | 7/2013 | Wang et al. | |
| 2013/0308709 A1* | 11/2013 | Norkin et al. | 375/240.25 |

OTHER PUBLICATIONS

Bross, et al., "High efficiency video coding (HEVC) text specification draft 6," JCTVC-H1003, Joint Collaborative Team on Video Coding (JCT-VC) of ITU-T SG16 WP3 and ISO/IEC JTC1/SC29/WG11, 8th Meeting: San José, CA, USA, Feb. 1-10, 2012, 259 pp.

(Continued)

*Primary Examiner* — Kevin McInnish
(74) *Attorney, Agent, or Firm* — Shumaker & Sieffert, P.A.

(57) ABSTRACT

A video encoder generates a bitstream that includes a syntax element that indicates whether a picture is encoded according either a first coding mode or a second coding mode. In the first coding mode, the picture is entirely encoded using wavefront parallel processing (WPP). In the second coding mode, each tile of the picture is encoded without using WPP and the picture may have one or more tiles. A video decoder may parse the syntax element from the bitstream. In response to determining that the syntax element has a particular value, the video decoder decodes the picture entirely using WPP. In response to determining that the syntax element does not have the particular value, the video decoder decodes each tile of the picture without using WPP.

40 Claims, 12 Drawing Sheets

(56) References Cited

OTHER PUBLICATIONS

Coban, et al., "AHG4: On tiles and wavefronts", JCT-VC Meeting; MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/ No. JCTVC-J0123, 6 pp.

Coban, et al., "AHG4: Unification of picture partitioning schemes", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL: http://wftp3.itu.int/av-arch/jctvc-site/, No. JCTVC-G315, 11 pp.

Clare, et al., "Wavefront Parallel Processing for HEVC Encoding and Decoding", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL: http://wftp3.itu.int/av-arch/jctvc-site/ No. JCTVC-F274, 16 pp.

Horowitz, "JCT-VC BoG report: tiles and wavefront parallel processing", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16 ); URL: http://wftp3.itu.int/av-arch/jctvc-site/, No. JCTVC-G1025, 8 pp.

Hsu, et al., "Wavefront Parallel Processing with Tiles", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16 ); URL: http://wftp3.itu.int/av-arch/jctvc-site/ No. JCTVC-F063, 7 pp.

International Preliminary Report on Patentability from International Application No. PCT/US2012/070680, dated Apr. 16, 2014, 11 pp.

International Search Report and Written Opinion from International Application No. PCT/US2012/070680, dated Aug. 19, 2013,. 18 pp.

Partial International Search Report from International Application No. PCT/US2012/070680, dated Mar. 21, 2013, 8 pp.

Wang, et al., "On wavefront parallel processing", JCT-VC Meeting; MPEG Meeting; Feb. 1, 2012-Feb. 10, 2012; San Jose; (Joint Collaborative Team on Video Coding of ISO/IEC JTC1/SC29/WG11 and ITU-T SG.16 ); URL: http://wftp3.itu.int/av-arch/jctvc-site/ No. JCTVC-H0517, XP030111544, 2 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

Liu C., et al., "RTP/AVPF Compliant Feedback for Error Resilient Video Coding in Conversational Applications" IEEE, 9th International Symposium on Communications and Information Technology, 2009. ISCIT 2009, Sep. 28-30, 2009, Icheon, pp. 218-223.

Wan W., et al., "Efficient Hierarchical Inter Picture Coding for H.264/AVC Baseline Profile" IEEE, Picture Coding Symposium, 2009, May 6-8, 2009, Chicago, pp. 1-4.

Bross et al., "High efficiency video coding (HEVC) text specification draft 6," Joint Collaborative Team on Video Coding, JCTVC-H1003, Nov. 21-30, 2011, 259 pp.

Bross et al., "High efficiency video coding (HEVC) text specification draft 7," Joint Collaborative Team on Video Coding, JCTVC-I1003_D2, Apr. 27-May 7, 2012, 290 pp.

Bross et al., "High efficiency video coding (HEVC) text specification draft 8," Joint Collaborative Team on Video Coding, JCTVC-J1003_D7, Jul. 11-20, 2012, 261 pp.

Bross et al., "High efficiency video coding (HEVC) text specification draft 9," Joint Collaborative Team on Video Coding, JCTVC-K1003_v7, Oct. 10-19, 2012, 290 pp.

Bross et al., "WD4: Working Draft 4 of High-Efficiency Video Coding," Joint Collaborative Team on Video Coding, JCTVC-F803_d2, Jul. 14-22, 2011, 226 pp.

Bross et al., "WD5: Working Draft 5 of High-Efficiency Video Coding," Joint Collaborative Team on Video Coding, JCTVC-G1103_d2, Nov. 21-30, 2011, 214 pp.

Clare, et al., "Wavefront and Cabac Flush: Different Degrees of Parallelism Without Transcoding," Joint Collaborative Team on Video Coding, JCTVC-F275, Jul. 14-22, 2011, 11 pp.

Clare et al., "Wavefront Parallel Processing for HEVC Encoding and Decoding," Joint Collaborative Team on Video Coding, JCTVC-F274, Jul. 14-22, 2011, 16 pp.

Fuldseth et al., "Tiles," Joint Collaborative Team on Video Coding, JCTVC-F335, Jul. 14-22, 2011, 15 pp.

International Telecommunication Union, "Advanced video coding for generic audiovisual services," Standardization Sector of ITU, Jun. 2011, 674 pp.

Misra et al., "New results for parallel decoding for Tiles," Joint Collaborative Team on Video Coding, JCTVC-F594, Jul. 14-22, 2011, 6 pp.

Schierl et al., "RTP Payload Format for High Efficiency Video Coding," Internet Engineering Task Force, Audio/Video Payload WG, Feb. 27, 2012, 43 pp.

U.S. Appl. No. 13/718,945, by Ye-Kui Wang, filed Dec. 18, 2012.

Wiegand et al., "WD2: Working Draft 2 of High-Efficiency Video Coding", Joint Collaborative Team on Video Coding, JCTVC-D503, Jan. 20-28, 2011, 153 pp.

Wiegand et al., "WD3: Working Draft 3 of High-Efficiency Video Coding," Joint Collaborative Team on Video Coding, JCTVC-E603, Mar. 16-23, 2011,193 pp.

Wiegand et al.,"WD1: Working Draft 1 of High-Efficiency Video Coding", Joint Collaborative Team on Video Coding, JCTVC-C403, Oct. 7-15, 2010, 137 pp.

ITU-T H.265, Series H: Audiovisual and Multimedia Systems, Infrastructure of audiovisual services—Coding of moving video, High efficiency video coding, The International Telecommunication Union, Apr. 2013, 317 pages.

Henry, et al., "Wavefront Parallel Processing", JCT-VC Meeting; MPEG Meeting; Geneva,CH, Joint Collaborative Team on Video Coding (JCT-VC) of ITU-T SG16 WP3 and ISO/IEC JTC1/SC29/WG11 No. m19714, Mar. 16-23, 2011, JCTVC-E196, 9 pp.

Office Action from U.S. Appl. No. 13/718,945, dated Aug. 5, 2015, 11 pp.

Final Rejection from U.S. Appl. No. 13/718,945, dated Nov. 25, 2015, 13 pp.

* cited by examiner

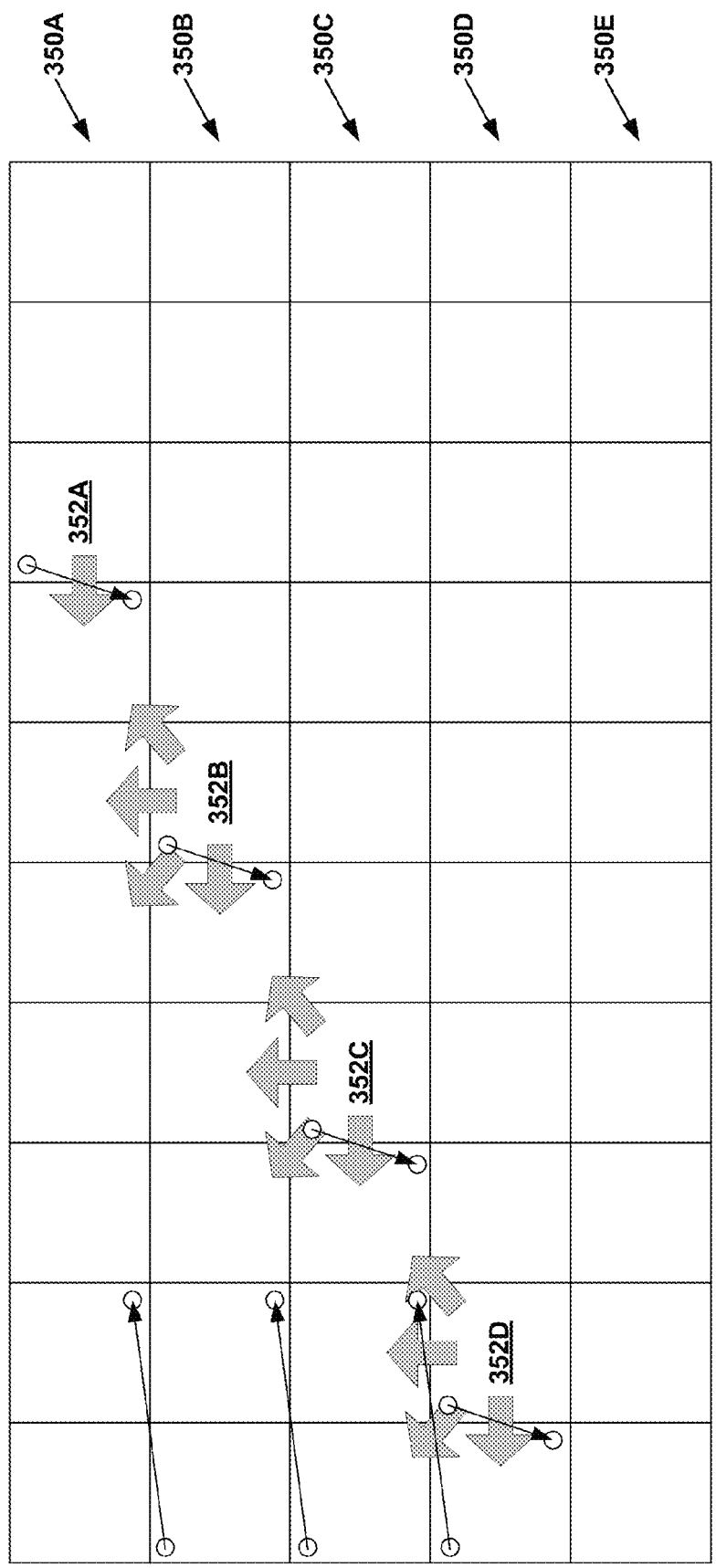

us 9,332,259 B2

INDICATION OF USE OF WAVEFRONT PARALLEL PROCESSING IN VIDEO CODING

This application claims the benefit of U.S. Provisional Patent Application No. 61/588,096, filed Jan. 18, 2012, the entire content of which is hereby incorporated by reference.

TECHNICAL FIELD

This disclosure relates to video coding (i.e., encoding and/or decoding of video data).

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as tree blocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual coefficients, which then may be quantized. The quantized coefficients, initially arranged in a two-dimensional array, may be scanned in order to produce a one-dimensional vector of coefficients, and entropy coding may be applied to achieve even more compression.

SUMMARY

In general, this disclosure describes techniques for video coding in which combinations of tiles and wavefront parallel processing (WPP) within a single picture is disallowed. More specifically, a video encoder generates a bitstream that includes a syntax element that indicates whether a picture is encoded according to either a first coding mode or a second coding mode. In the first coding mode the picture is entirely encoded using WPP. In the second coding mode, each tile of the picture is encoded without using WPP. A video decoder parses the syntax element form the bitstream and determines whether the syntax element has a particular value. In response to determining that the syntax element has the particular value, the video decoder decodes the picture entirely using WPP. In response to determining that the syntax element does not have the particular value, the video decoder decodes each tile of the picture without using WPP.

In one aspect, this disclosure describes a method for decoding video data. The method comprises parsing, from a bitstream that includes a coded representation of a picture in the video data, a syntax element. In addition, the method comprises, in response to determining that the syntax element has a particular value, decoding the picture entirely using WPP. The method also comprises, in response to determining that the syntax element does not have the particular value, decoding each tile of the picture without using WPP, wherein the picture has one or more tiles.

In another aspect, this disclosure describes a method for encoding video data. The method comprises generating a bitstream that includes a syntax element that indicates whether a picture is encoded according to either a first coding mode or a second coding mode. In the first coding mode, the picture is entirely encoded using WPP. In the second coding mode, each tile of the picture is encoded without using WPP, wherein the picture has one or more tiles.

In another aspect, this disclosure describes a video decoding device that comprises one or more processors configured to parse, from a bitstream that includes a coded representation of a picture in the video data, a syntax element. The one or more processors are configured to decode, in response to determining that the syntax element has a particular value, the picture entirely using WPP. In addition, the one or more processors are configured to decode, in response to determining that the syntax element does not have the particular value, each tile of the picture without using WPP, wherein the picture has one or more tiles.

In another aspect, this disclosure describes a video encoding device comprising one or more processors configured to generate a bitstream that includes a syntax element that indicates whether a picture is encoded according to either a first coding mode or a second coding mode. In the first coding mode, the picture is entirely encoded using WPP. In the second coding mode, each tile of the picture is encoded without using WPP, wherein the picture has one or more tiles.

In another aspect, this disclosure describes a video decoding device that comprises means for parsing, from a bitstream that includes a coded representation of a picture in the video data, a syntax element. The video decoding device also comprises means for decoding, in response to determining that the syntax element has a particular value, the picture entirely using WPP. In addition, the video decoding device comprises means for decoding, in response to determining that the syntax element does not have the particular value, each tile of the picture without using WPP, wherein the picture has one or more tiles.

In another aspect, this disclosure describes a video encoding device that comprises means for generating a bitstream that includes a syntax element that indicates whether a picture is encoded according to either a first coding mode or a second coding mode. In the first coding mode, the picture is entirely encoded using WPP. In the second coding mode, each tile of the picture is encoded without using WPP, wherein the picture has one or more tiles.

In another aspect, this disclosure describes a computer-readable storage medium that stores instructions that, when executed by one or more processors of a video decoding device, configure the video decoding device to parse, from a bitstream that includes a coded representation of a picture in the video data, a syntax element. The instructions also cause the video decoding device to decode, in response to determining that the syntax element has a particular value, the picture entirely using WPP. In addition, the instructions cause the video decoding device to decode, in response to determining that the syntax element does not have the particular value, each tile of the picture without using WPP, wherein the picture has one or more tiles.

In another aspect, a computer-readable storage medium that stores instructions that, when executed by one or more processors of a video encoding device, configure the video encoding device to generate a bitstream that includes a syntax element that indicates whether a picture is encoded according to either a first coding mode or a second coding mode. In the first coding mode, the picture is entirely encoded using WPP. In the second coding mode, each tile of the picture is encoded without using WPP, wherein the picture has one or more tiles.

The details of one or more examples of the disclosure are set forth in the accompanying drawings and the description below. Other features, objects, and advantages will be apparent from the description, drawings, and claims.

BRIEF DESCRIPTION OF DRAWINGS

FIG. 10 is a conceptual diagram that illustrates an example of WPP.

DETAILED DESCRIPTION

Figure 1:
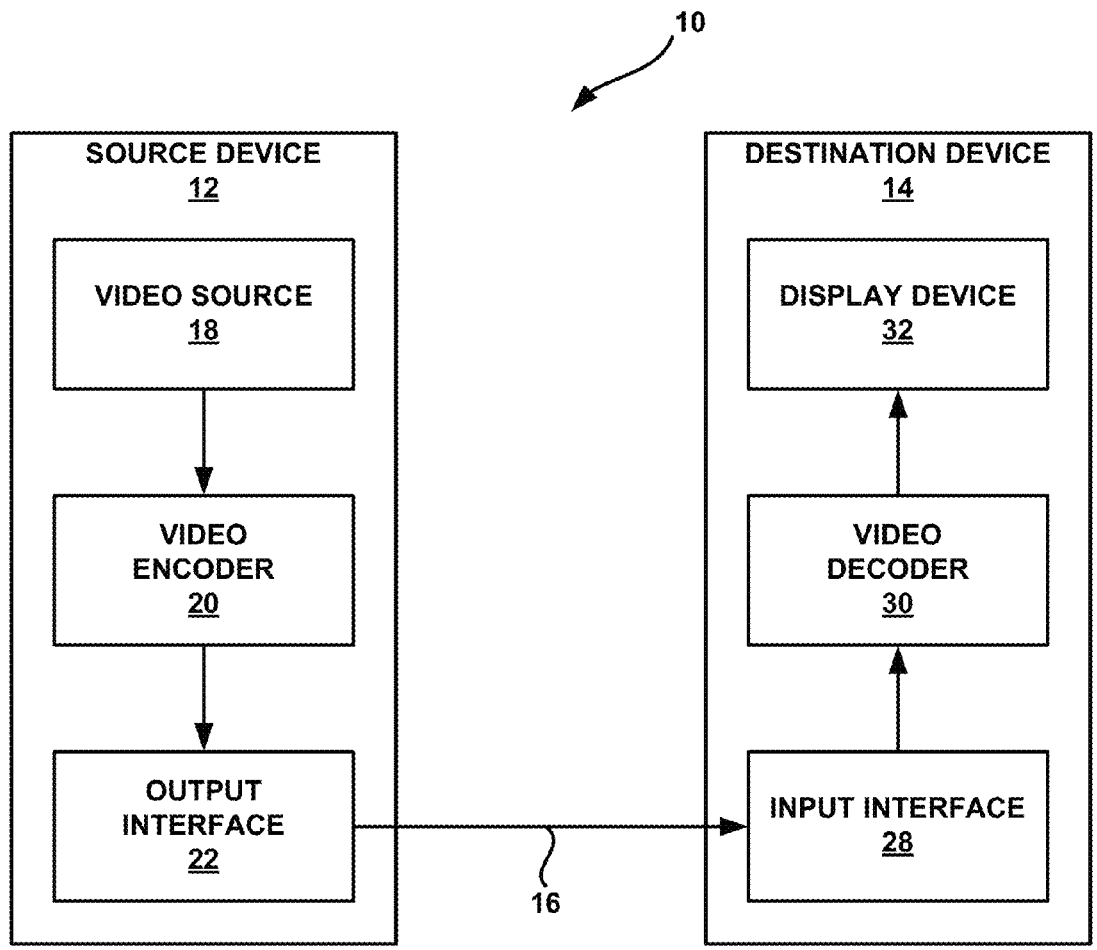
FIG. 1 is a block diagram illustrating an example video coding system that may utilize the techniques described in this disclosure.

During video coding, a picture may be partitioned into multiple tiles, wavefront parallel processing (WPP) waves, and/or entropy slices. The tiles of a picture are defined by horizontal and/or vertical tile boundaries that pass through the picture. The tiles of a picture are coded according to a raster scan order and coding tree blocks (CTBs) within each tile are also coded according to the raster scan order. In WPP, each row of CTBs in a picture is a "WPP wave." When a video coder uses WPP to code the picture, the video coder may start coding the CTBs of a WPP wave from left-to-right after the video coder has coded two or more CTBs of an immediately higher WPP wave. An entropy slice may include a series of consecutive CTBs according to a raster scan order. Use of information from across entropy slice boundaries is prohibited for use in selection of entropy coding contexts, but may be allowed for other purposes.

In existing video coding systems, a picture may have any combination of tiles, WPP waves, and entropy slices. For example, a picture may be partitioned into a plurality of tiles. In this example, the CTBs in some of the tiles may be coded according to the raster scan order while CTBs in other ones of the tiles may be coded using WPP. Allowing a picture to include combinations of tiles, WPP waves, and entropy slices may unnecessarily increase the implementation complexity and costs of such video coding systems.

The techniques of this disclosure may remedy this problem. That is, in accordance with the techniques of this disclosure, combinations within a picture of any of two or more tiles, WPP waves, and entropy slices are disallowed. For instance, a video encoder may generate a bitstream that includes a syntax element that indicates whether a picture is encoded according to either a first coding mode or a second coding mode. In the first coding mode, the picture is entirely encoded using WPP. In the second coding mode, the picture has one or more tiles and each tile of the picture is encoded without using WPP.

Furthermore, in this example, a video decoder may parse, from a bitstream that includes a coded representation of a picture, a syntax element. In response to determining that the syntax element has a particular value, the video decoder may decode the picture entirely using WPP. In response to determining that the syntax element does not have the particular value, the video decoder may decode each tile of the picture without using WPP. The picture may have one or more tiles.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

FIG. 1 is a block diagram illustrating an example video coding system 10 that may utilize the techniques of this disclosure. As used described herein, the term "video coder"

refers generically to both video encoders and video decoders. In this disclosure, the terms "video coding" or "coding" may refer generically to video encoding or video decoding.

As shown in FIG. 1, video coding system 10 includes a source device 12 and a destination device 14. Source device 12 generates encoded video data. Accordingly, source device 12 may be referred to as a video encoding device or a video encoding apparatus. Destination device 14 may decode the encoded video data generated by source device 12. Accordingly, destination device 14 may be referred to as a video decoding device or a video decoding apparatus. Source device 12 and destination device 14 may be examples of video coding devices or video coding apparatuses. Source device 12 and destination device 14 may comprise a wide range of devices, including desktop computers, mobile computing devices, notebook (e.g., laptop) computers, tablet computers, set-top boxes, telephone handsets such as so-called "smart" phones, televisions, cameras, display devices, digital media players, video gaming consoles, in-car computers, or the like.

Destination device 14 may receive encoded video data from source device 12 via a channel 16. Channel 16 may comprise one or more media and/or devices capable of moving the encoded video data from source device 12 to destination device 14. In one example, channel 16 may comprise one or more communication media that enable source device 12 to transmit encoded video data directly to destination device 14 in real-time. In this example, source device 12 may modulate the encoded video data according to a communication standard, such as a wireless communication protocol, and may transmit the modulated video data to destination device 14. The one or more communication media may include wireless and/or wired communication media, such as a radio frequency (RF) spectrum or one or more physical transmission lines. The one or more communication media may form part of a packet-based network, such as a local area network, a wide-area network, or a global network (e.g., the Internet). The one or more communication media may include routers, switches, base stations, or other equipment that facilitate communication from source device 12 to destination device 14.

In another example, channel 16 may include to a storage medium that stores encoded video data generated by source device 12. In this example, destination device 14 may access the storage medium via disk access or card access. The storage medium may include a variety of locally-accessed data storage media such as Blu-ray discs, DVDs, CD-ROMs, flash memory, or other suitable digital storage media for storing encoded video data.

In a further example, channel 16 may include a file server or another intermediate storage device that stores encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website), file transfer protocol (FTP) servers, network attached storage (NAS) devices, and local disk drives.

Destination device 14 may access the encoded video data through a standard data connection, such as an Internet connection. Example types of data connections include wireless channels (e.g., Wi-Fi connections), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of a variety of multimedia applications, such as over-the-air television broadcasts, cable television transmissions, satellite television transmissions, streaming video transmissions, e.g., via the Internet, encoding of video data for storage on a data storage medium, decoding of video data stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, a video encoder 20, and an output interface 22. In some examples, output interface 22 may include a modulator/demodulator (modem) and/or a transmitter. Video source 18 may include a video capture device, e.g., a video camera, a video archive containing previously-captured video data, a video feed interface to receive video data from a video content provider, and/or a computer graphics system for generating video data, or a combination of such sources of video data.

Video encoder 20 may encode video data from video source 18. In some examples, source device 12 directly transmits the encoded video data to destination device 14 via output interface 22. The encoded video data may also be stored onto a storage medium or a file server for later access by destination device 14 for decoding and/or playback.

In the example of FIG. 1, destination device 14 includes an input interface 28, a video decoder 30, and a display device 32. In some examples, input interface 28 includes a receiver and/or a modem. Input interface 28 may receive encoded video data over channel 16. Display device 32 may be integrated with or may be external to destination device 14. In general, display device 32 displays decoded video data. Display device 32 may comprise a variety of display devices, such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). A draft of the upcoming HEVC standard, referred to as "HEVC Working Draft 5" or "WD5," is described in Bross et al., "WD5: Working Draft 5 of High-Efficiency Video Coding," Joint Collaborative Team on Video Coding (JCT-VC) of ITU-T SG16 WP3 and ISO/IEC JTC1/SC29/WG11, 7th Meeting: Geneva, Switzerland, November, 2011, which, as of Oct. 10, 2012, is downloadable from: http://phenix.int-evey.fr/jct/doc_end_user/documents/7_Geneva/wg11/JCTVC-G1103-v3.zip, the entire content of which is incorporated herein by reference. Another draft of the upcoming HEVC standard, referred to as "HEVC Working Draft 9," is described in Bross et al., "High Efficiency Video Coding (HEVC) text specification draft 9," Joint Collaborative Team on Video Coding (JCT-VC) of ITU-T SG16 WP3 and ISO/IEC JTC1/SC29/WG11, 11th Meeting: Shanghai, China, October, 2012, which, as of Nov. 7, 2012, is downloadable from: http://phenix.int-evry.fr/jct/doc_end_user/documents/11_Shanghai/wg11/JCTVC-K1003-v8.zip, the entire content of which is incorporated herein by reference.

Alternatively, video encoder 20 and video decoder 30 may operate according to other proprietary or industry standards, including ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The techniques of this disclosure, however, are not limited to any particular coding standard or technique.

Again, FIG. 1 is merely an example and the techniques of this disclosure may apply to video coding settings (e.g., video encoding or video decoding) that do not necessarily include any data communication between the encoding and decoding devices. In other examples, data is retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application-specific integrated circuits (ASICs), field-programmable gate arrays (FPGAs), discrete logic, hardware, or any combinations thereof. If the techniques are implemented partially in software, a device may store instructions for the software in a suitable, non-transitory computer-readable storage medium and may execute the instructions in hardware using one or more processors to perform the techniques of this disclosure. Any of the foregoing (including hardware, software, a combination of hardware and software, etc.) may be considered to be one or more processors. Each of video encoder 20 and video decoder 30 may be included in one or more encoders or decoders, either of which may be integrated as part of a combined encoder/decoder (CODEC) in a respective device.

This disclosure may generally refer to video encoder 20 "signaling" certain information to another device, such as video decoder 30. The term "signaling" may generally refer to the communication of syntax elements and/or other data that represent encoded video data. Such communication may occur in real- or near-real-time. Alternately, such communication may occur over a span of time, such as might occur when storing syntax elements to a computer-readable storage medium in an encoded bitstream at the time of encoding, which then may be retrieved by a decoding device at any time after being stored to this medium.

As mentioned briefly above, video encoder 20 encodes video data. The video data may comprise one or more pictures. Each of the pictures may be a still image. In some instances, a picture may be referred to as a video "frame." Video encoder 20 may generate a bitstream that includes a sequence of bits that form a coded representation of the video data. The bitstream may include coded pictures and associated data. A coded picture is a coded representation of a picture. The associated data may include sequence parameter sets (SPSs), picture parameter sets (PPSs), and other syntax structures. A SPS may contain parameters applicable to zero or more sequences of pictures. A PPS may contain parameters applicable to zero or more pictures.

To generate an encoded representation of a picture, video encoder 20 may partition the picture into a grid of coding tree blocks (CTBs). In some instances, a CTB may be referred to as a "tree block", a "largest coding unit" (LCU) or a "coding tree unit." The CTBs of HEVC may be broadly analogous to the macroblocks of previous standards, such as H.264/AVC. However, a CTB is not necessarily limited to a particular size and may include one or more coding units (CUs).

Each of the CTBs may be associated with a different equally-sized block of pixels within the picture. Each pixel may comprise a luminance (luma) sample and two chrominance (chroma) samples. Thus, each CTB may be associated with a block of luminance samples and two blocks of chrominance samples. For ease of explanation, this disclosure may refer to a two-dimensional array of pixels as a pixel block and may refer to a two-dimensional array of samples as a sample block. Video encoder 20 may use quad-tree partitioning to partition the pixel block associated with a CTB into pixel blocks associated with CUs, hence the name "coding tree blocks."

The CTBs of a picture may be grouped into one or more slices. In some examples, each of the slices includes an integer number of CTBs. As part of encoding a picture, video encoder 20 may generate encoded representations of each slice of the picture (i.e., coded slices). To generate a coded slice, video encoder 20 may encode each CTB of the slice to generate encoded representations of each of the CTBs of the slice (i.e., coded CTBs).

To generate a coded CTB, video encoder 20 may recursively perform quad-tree partitioning on the pixel block associated with a CTB to divide the pixel block into progressively-smaller pixel blocks. Each of the smaller pixel blocks may be associated with a CU. A partitioned CU may be a CU whose pixel block is partitioned into pixel blocks associated with other CUs. A non-partitioned CU may be a CU whose pixel block is not partitioned into pixel blocks associated with other CUs.

Video encoder 20 may generate one or more prediction units (PUs) for each non-partitioned CU. Each of the PUs of a CU may be associated with a different pixel block within the pixel block of the CU. Video encoder 20 may generate predictive pixel blocks for each PU of the CU. The predictive pixel block of a PU may be a block of pixels.

Video encoder 20 may use intra prediction or inter prediction to generate the predictive pixel block for a PU. If video encoder 20 uses intra prediction to generate the predictive pixel block of a PU, video encoder 20 may generate the predictive pixel block of the PU based on decoded pixels of the picture associated with the PU. If video encoder 20 uses inter prediction to generate the predictive pixel block of the PU, video encoder 20 may generate the predictive pixel block of the PU based on decoded pixels of one or more pictures other than the picture associated with the PU.

Video encoder 20 may generate a residual pixel block for a CU based on predictive pixel blocks of the PUs of the CU. The residual pixel block for the CU may indicate differences between samples in the predictive pixel blocks for the PUs of the CU and corresponding samples in the original pixel block of the CU.

Furthermore, as part of encoding a non-partitioned CU, video encoder 20 may perform recursive quad-tree partitioning on the residual pixel block of the CU to partition the residual pixel block of the CU into one or more smaller residual pixel blocks associated with transform units (TUs) of the CU. Because the pixels in the pixel blocks associated with the TUs each include a luma sample and two chroma samples, each of the TUs may be associated with a residual sample block of luma samples and two residual sample blocks of chroma samples.

Video coder 20 may apply one or more transforms to the residual sample blocks associated with the TUs to generate coefficient blocks (i.e., blocks of coefficients). Video encoder 20 may perform a quantization process on each of the coefficient blocks. Quantization generally refers to a process in which coefficients are quantized to possibly reduce the amount of data used to represent the coefficients, providing further compression.

Video encoder 20 may generate sets of syntax elements that represent the coefficients in the quantized coefficient blocks. Video encoder 20 may apply entropy encoding operations, such as Context Adaptive Binary Arithmetic Coding (CABAC) operations, to at least some of these syntax elements. As part of performing an entropy encoding operation, video encoder 20 may select a coding context. In the case of CABAC, the coding context may indicate probabilities of 0-valued and 1-valued bins.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a SPS, a PPS, a coded slice, supplemental enhancement information (SEI), an access unit delimiter, filler data, or another type of data. Coded slice NAL units are NAL units that include coded slices.

Video decoder 30 may receive a bitstream. The bitstream may include a coded representation of video data encoded by video encoder 20. Video decoder 30 may parse the bitstream to extract syntax elements from the bitstream. As part of extracting some syntax elements from the bitstream, video decoder 30 may entropy decode (e.g., CABAC decode, exponential-Golomb decode, etc.) data in the bitstream. Video decoder 30 may reconstruct the pictures of the video data based on the syntax elements extracted from the bitstream.

The process to reconstruct the video data based on the syntax elements may be generally reciprocal to the process performed by video encoder 20 to generate the syntax elements. For instance, video decoder 30 may generate, based on syntax elements associated with a CU, predictive pixel blocks for PUs of the CU. In addition, video decoder 30 may inverse quantize coefficient blocks associated with TUs of the CU. Video decoder 30 may perform inverse transforms on the coefficient blocks to reconstruct residual pixel blocks associated with the TUs of the CU. Video decoder 30 may reconstruct the pixel block of a CU based on the predictive pixel blocks and the residual pixel blocks.

In some examples, video encoder 20 may divide a picture into a plurality of entropy slices. This disclosure may use the term "regular slice" to differentiate slices from entropy slices. An entropy slice may include a subset of the CUs of a regular slice. In some examples, video encoder 20 may partition the CUs among entropy slices such that none of the entropy slices includes more bins (e.g., entropy coded bits) than an upper limit. Each entropy slice may be included in a separate NAL unit.

In this disclosure, in-picture prediction may refer to the use of information associated with a first unit (e.g., CTB, CU, PU, etc.) of a picture for coding a second unit of the same picture. In-picture prediction across entropy slice boundaries is allowed, except for the purpose of entropy coding. For example, if a video coder (e.g., video encoder 20 or video decoder 30) is performing intra prediction on a particular PU, the video coder may use samples from a neighboring PU, even if the neighboring PU is in a different entropy slice than the particular PU. In this example, the video coder may not be able to use samples from the neighboring PU if the neighboring PU is in a different slice than the particular PU.

However, when a video coder is performing entropy coding on data associated with a particular PU, the video coder is only allowed to select coding contexts based on information associated with a neighboring PU if the particular PU and the neighboring PU are in the same entropy slice. Because of this restriction, the video coder may be able to perform entropy coding (i.e., entropy encoding or decoding) operations on multiple entropy slices of a slice in parallel. Hence, video decoder 30 may be able to parse, in parallel, the syntax elements of multiple entropy slices. However, video decoder 30 is not able to reconstruct the pixel blocks of multiple entropy slices of a slice in parallel.

As indicated above, a coded slice NAL unit may contain a coded slice. This slice may be either an entropy slice or a regular slice. The slice header in the coded slice NAL unit may include a syntax element (e.g., entropy_slice_flag) that indicates whether the slice is an entropy slice or a regular slice. For instance, if the syntax element is equal to 1, the slice in the coded slice NAL unit may be an entropy slice.

Each coded slice may include a slice header and slice data. The slice headers of entropy slices may be different than the slice headers of regular slices. For instance, the syntax elements in the slice headers of entropy slices may include a subset of the syntax elements in the slice headers of regular slices. Because the slice headers of entropy slices include fewer syntax elements than the slice headers of regular slices, entropy slices may also be referred to as lightweight slices, slices with short slice headers, or short slices. An entropy slice may inherit, from a slice header of a regular slice that precedes the entropy slice in decoding order, the syntax elements omitted from the slice header of the entropy slice.

Conventionally, video encoders generate separate NAL units for each entropy slice. Individual NAL units are often transported on a network in separate packets. In other words, there may be one NAL unit per packet during transmission of the NAL units through a network. This may be problematic for NAL units that contain entropy slices. If a packet that contains a NAL unit that includes a regular slice is lost during transmission, video decoder 30 may be unable to use entropy slices that inherit syntax elements from the slice header of the regular slice. Furthermore, if one or more CTBs of a first entropy slice rely on one or more CTBs of a second entropy slice for in-picture prediction and a packet that contains a NAL unit that includes the second entropy slice is lost during transmission, video encoder 30 may be unable to decode the CTBs of the first entropy slice.

In some examples, a video coder may code at least portions of a picture using wavefront parallel processing (WPP). FIG. 9, described in detail below, is a conceptual diagram that illustrates an example of WPP. If a video coder codes the picture using WPP, the video coder may divide the CTBs of the picture into a plurality of "WPP waves." Each of the WPP waves may correspond to a different row of CTBs in the picture. If the video coder codes the picture using WPP, the video coder may start coding a top row of CTBs. After the video coder has coded two or more CTBs of the top row, the video coder may start coding a second-to-top row of CTBs in parallel with coding the top row of CTBs. After the video coder has coded two or more CTBs of the second-to-top row, the video coder may start coding a third-to-top row of CTBs in parallel with coding the higher rows of CTBs. This pattern may continue down the rows of CTBs in the picture.

If the video coder is using WPP, the video coder may use information associated with spatially-neighboring CUs outside a current CTB to perform in-picture prediction on a particular CU in the current CTB, so long as the spatially-neighboring CUs are left, above-left, above, or above-right of the current CTB. If the current CTB is the leftmost CTB in a row other than the topmost row, the video coder may use information associated with the second CTB of the immediately higher row to select a context for CABAC coding one or more syntax elements of the current CTB. Otherwise, if the current CTB is not the leftmost CTB in the row, the video coder may use information associated with a CTB to the left of the current CTB to select a context for CABAC coding one or more syntax elements of the current CTB. In this way, the video coder may initialize CABAC states of a row based on the CABAC states of the immediately higher row after encoding two or more CTBs of the immediately higher row.

Thus, in response to determining that a first CTB is separated from a left boundary of the picture by a single CTB, a video coder may store context variables associated with the first CTB. The video coder may entropy code (e.g., entropy encode or entropy decode), based at least in part on the context variables associated with the first CTB, one or more syntax elements of a second CTB, the second CTB being adjacent to the left boundary of the picture and one row of CTBs lower than the first CTB.

Coded CTBs of a slice are ordinarily arranged in a coded slice NAL unit according to raster scan order, even when WPP is used. This may complicate the design of video coders that implement WPP. When the number of WPP waves is greater than one and less than the number of CTB rows of the picture, the bitstream order (i.e. the decoding order if the coded picture is processed by one decoder core, not decoded in parallel) of coded bits for CTBs is changed as compared to when WPP is not applied as follows. A coded CTB later in bitstream/decoding order may be needed for in-picture prediction by another coded CTB earlier in decoding order. This may break the bitstream causality in which no earlier data depends on data coming later in bitstream/decoding order. Bitstream causality has been a generally-followed principle in video coding designs, including video coding standards. While the decoding process works, the decoding process may be more complex as a bitstream pointer that indicates a current position in the bitstream may move backward and forward within the portion of the bitstream associated with a coded slice NAL unit.

In some examples, video encoder 20 may divide a picture into one or more tiles. The tiles may comprise non-overlapping sets of the CTBs of the picture. Video encoder 20 may divide the picture into tiles by defining two or more vertical tile boundaries and two or more horizontal tile boundaries. Each vertical side of the picture may be a vertical tile boundary. Each horizontal side of the current picture may be a horizontal tile boundary. For example, if video encoder 20 defines four vertical tile boundaries and three horizontal tile boundaries for the picture, the current picture is divided into six tiles.

A video coder, such as video encoder 20 or video decoder 30, may code the CTBs of tiles of a picture according to a tile scan order. To code the CTBs according to the tile scan order, the video coder may code the tiles of a picture according to raster scan order. That is, the video coder may code each tile in a row of tiles in a left-to-right order, starting from a top row of tiles and then proceeding down the picture. Furthermore, the video coder may code each CTB within a tile according to a raster scan order. In this way, the video coder may code each CTB of a given tile of the picture before coding any CTB of another tile of the picture. In other words, the tile scan order traverses CTBs in CTB raster scan order within a tile and traverses tiles in tile raster scan order within a picture. Consequently, the order in which the video coder codes the CTBs of the picture may be different if the picture is partitioned into multiple tiles than if the picture is not partitioned into multiple tiles. FIG. 10, described below, is a conceptual diagram illustrating an example tile scan order when a picture is partitioned into a plurality of tiles.

In some instances, a video coder may perform in-picture prediction across tile boundaries, but not across slice boundaries. In other instances, in-picture prediction is prohibited across tile boundaries and slice boundaries. In instances where in-picture prediction is prohibited across tile boundaries and slice boundaries, a video coder may be able to code, in parallel, multiple tiles.

In some examples, in-picture prediction across tile boundaries is controlled by a flag (e.g., "tile_boundary_independence_idc"). If the flag is equal to 1, in-picture prediction across tile boundaries is disallowed within a picture. Otherwise, in-picture prediction across tile boundaries is allowed, except for the tile boundaries that are also picture boundaries or slice boundaries. If in-picture prediction across tile boundaries is allowed, the functionality of tiles may be to change the scan order of CTBs as compared to the case where the picture has no tiles, or equivalently, only one tile. If in-picture prediction across tile boundaries is not allowed, besides changing the scan order of CTBs, tiles may also provide independent partitioning that can be used for parallel coding (encoding and/or decoding) of tiles. Thus, if the picture is partitioned into at least a first tile and a second tile, when video decoder 30 decodes the tiles without using WPP, video decoder 30 may decode, in parallel, a CTB of the first tile and a CTB of the second tile.

In some instances, a picture may be partitioned into a combination of tiles, WPP waves, and entropy slices. For example, a picture may be partitioned into a tile and a set of WPP waves. In another example, a picture may be partitioned into two tiles and an entropy slice. Allowing combinations of tiles, WPP waves, and entropy slices within a picture may be problematic because allowing such combinations may increase the complexity and costs of video encoders and/or video decoders.

The techniques of this disclosure may resolve the problems described above. In accordance with the techniques of this disclosure, a picture may not be partitioned into any combination of tiles, WPP waves, and entropy slices. In other words, a picture may be partitioned into one or more tiles, the picture may be partitioned into WPP waves, or the picture may be partitioned into one or more entropy slices. However, a picture may not be partitioned into any of the following combinations: (a) tiles, WPP waves and entropy slices, (b) tiles and WPP waves, (c) tiles and entropy slices, or (d) WPP waves and entropy slices.

To accomplish this, video encoder 20 may include, in a bitstream, a syntax element that indicates that a picture is encoded according to either a first coding mode or a second coding mode. In the first coding mode, the picture is entirely encoded using WPP. That is, each row of CTBs in the picture may be encoded as a WPP wave. In the second coding mode, the picture may have one or more tiles. Furthermore, in the second coding mode, each tile of the picture may be encoded without using WPP. For instance, in the second coding mode, video encoder 20 may, for each tile of a picture, encode the CTBs within the tile sequentially in an order from left-to-right across rows of CTBs and down the rows of CTBs of the tile. For ease of explanation, this syntax element may be referred to herein as the coding mode syntax element.

Video decoder 30 may parse, from a bitstream that includes a coded representation of a picture in the video data, a syntax element. In response to determining that the syntax element has a particular value, video decoder 30 may decode the picture entirely using WPP. In response to determining that the syntax element does not have the particular value, video decoder 30 may decode each tile of the picture without using WPP, wherein the picture has one or more tiles.

Various portions of the bitstream may include the coding mode syntax element. For example, video encoder 20 may generate a SPS that includes the coding mode syntax element. In this example, video decoder 30 may parse, from the bitstream, a SPS that includes the coding mode syntax element. In another example, video encoder 20 may generate a PPS that includes the coding mode syntax element. In this example, video decoder 30 may parse, from the bitstream, a PPS that includes the coding mode syntax element. Furthermore, if a picture is encoded according to the second coding mode, the bitstream may include one or more syntax elements that indicate whether entropy slices are enabled for the picture. Various portions of the bitstream may include the one or more syntax elements that indicate whether entropy slices are enabled for a picture. For example, a SPS may include one or more syntax elements that indicate that entropy slices are enabled for pictures associated with the SPS. In another example, a PPS may include one or more syntax elements that indicate that entropy slices are enabled for pictures associated with the PPS. For instance, in this example, a PPS may include an entropy_slice_enabled_flag syntax element that indicates whether or not coded slices that refer to the PPS may consist of entropy slices.

If the picture includes one or more entropy slices, each entropy slice associated with a slice of the picture may be included in a single coded slice NAL unit, instead of being included in separate NAL units. Thus, an entropy slice may be defined as a subset of a slice, wherein the entropy decoding process of an entropy slice is independent of other entropy slices in the same slice.

As mentioned briefly above, the bitstream may include coded slice NAL units that include coded slices. A coded slice may comprise a slice header and slice data. The slice data may include one or more sub-streams. In accordance with the techniques of this disclosure, if the picture is encoded in the first coding mode (i.e., the picture is entirely encoded using WPP), each row of CTBs of the slice is represented by a single one of the sub-streams. If the picture is encoded in the second coding mode (i.e., each tile of the picture is encoded without using WPP), each tile of the picture that has one or more CTBs in the slice is represented by a single one of the sub-streams.

Furthermore, in accordance with the techniques of this disclosure, a slice header of a coded slice may include a set of syntax elements that indicate entry points of tiles, WPP waves, or entropy slices within the slice data of the coded slice NAL unit. The entry point of a sub-stream may be a first bit of the sub-stream. Furthermore, the tiles, WPP waves, or entropy slices within the slice data of a coded slice NAL unit may include padding bits that ensure that the tiles, WPP waves, or entropy slices are byte aligned.

Figure 2:
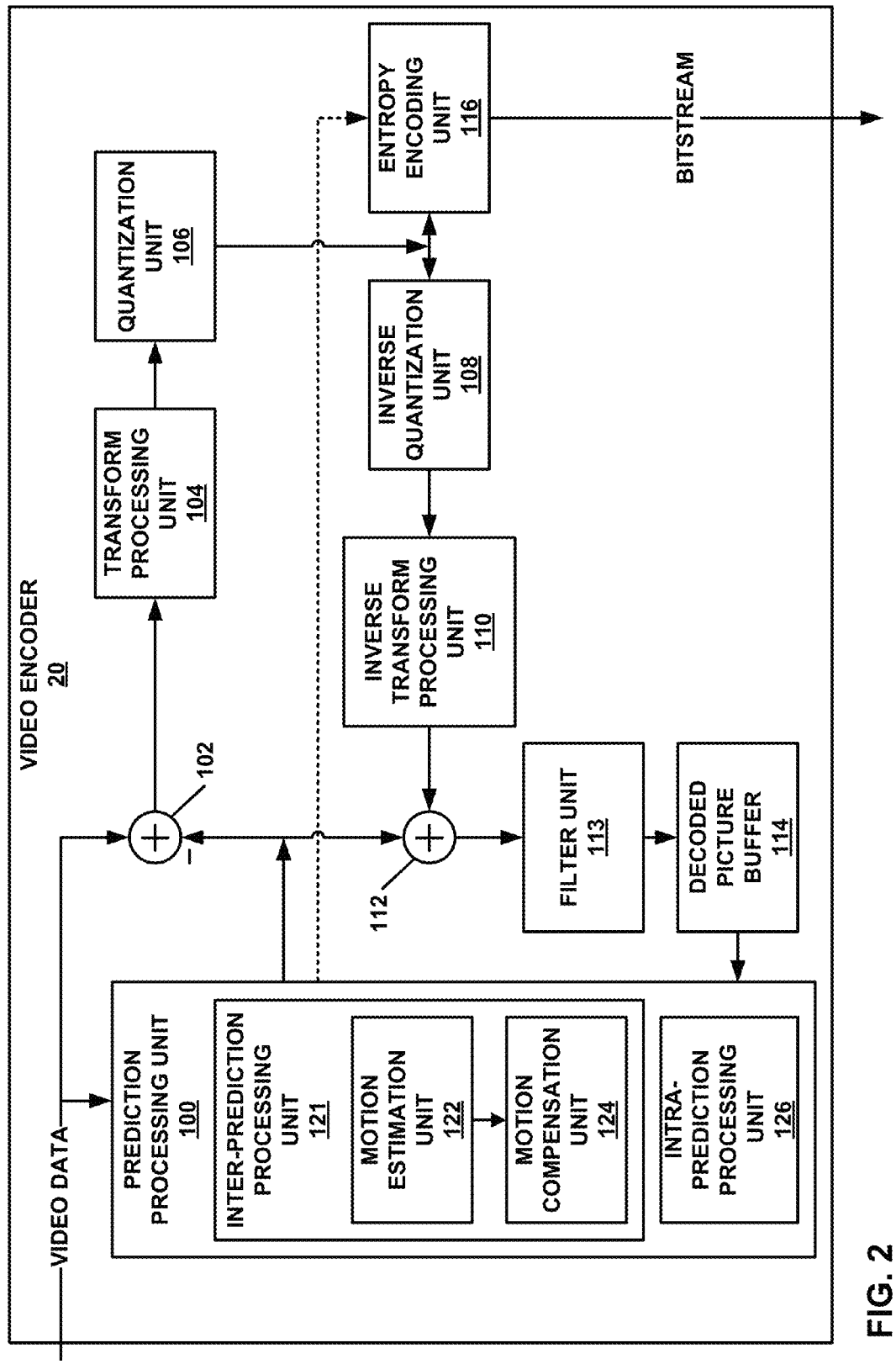
FIG. 2 is a block diagram illustrating an example video encoder that may implement the techniques described in this disclosure.

FIG. 2 is a block diagram that illustrates an example video encoder 20 that is configured to implement the techniques of this disclosure. FIG. 2 is provided for purposes of explanation and should not be considered limiting of the techniques as broadly exemplified and described in this disclosure. For purposes of explanation, this disclosure describes video encoder 20 in the context of HEVC coding. However, the techniques of this disclosure may be applicable to other coding standards or methods.

In the example of FIG. 2, video encoder 20 includes a prediction processing unit 100, a residual generation unit 102, a transform processing unit 104, a quantization unit 106, an inverse quantization unit 108, an inverse transform processing unit 110, a reconstruction unit 112, a filter unit 113, a decoded picture buffer 114, and an entropy encoding unit 116. Prediction processing unit 100 includes an inter-prediction processing unit 121 and an intra-prediction processing unit 126. Inter-prediction processing unit 121 includes a motion estimation unit 122 and a motion compensation unit 124. In other examples, video encoder 20 may include more, fewer, or different functional components.

Video encoder 20 may receive video data. To encode the video data, video encoder 20 may encode each slice of each picture of the video data. As part of encoding a slice, video encoder 20 may encode each CTB in the slice. As part of encoding a CTB, prediction processing unit 100 may perform quad-tree partitioning on the pixel block associated with the CTB to divide the pixel block into progressively-smaller pixel blocks. The smaller pixel blocks may be associated with CUs. For example, prediction processing unit 100 may partition the pixel block of a CTB into four equally-sized sub-blocks, partition one or more of the sub-blocks into four equally-sized sub-sub-blocks, and so on.

Video encoder 20 may encode CUs of a CTB to generate encoded representations of the CUs (i.e., coded CUs). Video encoder 20 may encode the CUs of a CTB according to a z-scan order. In other words, video encoder 20 may encode a top-left CU, a top-right CU, a bottom-left CU, and then a bottom-right CU, in that order. When video encoder 20 encodes a partitioned CU, video encoder 20 may encode CUs associated with sub-blocks of the pixel block of the partitioned CU according to the z-scan order.

As part of encoding a CU, prediction processing unit 100 may partition the pixel block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N for intra prediction, and symmetric PU sizes of 2N×2N, 2N×N, N×2N, N×N, or similar for inter prediction. Video encoder 20 and video decoder 30 may also support asymmetric partitioning for PU sizes of 2N×nU, 2N×nD, nL×2N, and nR×2N for inter prediction.

Inter-prediction processing unit 121 may generate predictive data for a PU by performing inter prediction on each PU of a CU. The predictive data for the PU may include a predictive pixel block that corresponds to the PU and motion information for the PU. Slices may be I slices, P slices, or B slices. Inter-prediction unit 121 may perform different operations for a PU of a CU depending on whether the PU is in an I slice, a P slice, or a B slice. In an I slice, all PUs are intra predicted. Hence, if the PU is in an I slice, inter-prediction unit 121 does not perform inter prediction on the PU.

If a PU is in a P slice, motion estimation unit 122 may search the reference pictures in a list of reference pictures (e.g., "list 0") for a reference block for the PU. The reference block of the PU may be a pixel block that most closely corresponds to the pixel block of the PU. Motion estimation unit 122 may generate a reference picture index that indicates the reference picture in list 0 containing the reference block of the PU and a motion vector that indicates a spatial displacement between the pixel block of the PU and the reference block. Motion estimation unit 122 may output the reference picture index and the motion vector as the motion information of the PU. Motion compensation unit 124 may generate the predictive pixel block of the PU based on the reference block indicated by the motion information of the PU.

If a PU is in a B slice, motion estimation unit 122 may perform uni-directional inter prediction or bi-directional inter prediction for the PU. To perform uni-directional inter prediction for the PU, motion estimation unit 122 may search the reference pictures of a first reference picture list ("list 0") or a second reference picture list ("list 1") for a reference block for the PU. Motion estimation unit 122 may output, as the motion information of the PU, a reference picture index that indicates a position in list 0 or list 1 of the reference picture that contains the reference block, a motion vector that indicates a spatial displacement between the pixel block of the PU and the reference block, and a prediction direction indicator that indicates whether the reference picture is in list 0 or list 1.

To perform bi-directional inter prediction for a PU, motion estimation unit 122 may search the reference pictures in list 0 for a reference block for the PU and may also search the reference pictures in list 1 for another reference block for the PU. Motion estimation unit 122 may generate reference picture indexes that indicate positions in list 0 and list 1 of the reference pictures that contain the reference blocks. In addition, motion estimation unit 122 may generate motion vectors that indicate spatial displacements between the reference blocks and the pixel block of the PU. The motion information of the PU may include the reference picture indexes and the motion vectors of the PU. Motion compensation unit 124 may generate the predictive pixel block of the PU based on the reference blocks indicated by the motion information of the PU.

Intra-prediction processing unit 126 may generate predictive data for a PU by performing intra prediction on the PU. The predictive data for the PU may include a predictive pixel block for the PU and various syntax elements. Intra-prediction processing unit 126 may perform intra prediction on PUs in I slices, P slices, and B slices.

To perform intra prediction on a PU, intra-prediction processing unit 126 may use multiple intra prediction modes to generate multiple sets of predictive data for the PU. To use an intra prediction mode to generate a set of predictive data for the PU, intra-prediction processing unit 126 may extend samples from sample blocks of neighboring PUs across the sample blocks of the PU in a direction associated with the intra prediction mode. The neighboring PUs may be above, above and to the right, above and to the left, or to the left of the PU, assuming a left-to-right, top-to-bottom encoding order for PUs, CUs, and CTBs. Intra-prediction processing unit 126 may use various numbers of intra prediction modes, e.g., 33 directional intra prediction modes. In some examples, the number of intra prediction modes may depend on the size of the pixel block of the PU.

Prediction processing unit 100 may select the predictive data for PUs of a CU from among the predictive data generated by inter-prediction processing unit 121 for the PUs or the predictive data generated by intra-prediction processing unit 126 for the PUs. In some examples, prediction processing unit 100 selects the predictive data for the PUs of the CU based on rate/distortion metrics of the sets of predictive data. The predictive pixel blocks of the selected predictive data may be referred to herein as the selected predictive pixel blocks.

Residual generation unit 102 may generate, based on the pixel block of a CU and the selected predictive pixel blocks of the PUs of the CU, a residual pixel block of a CU. For instance, residual generation unit 102 may generate the residual pixel block of the CU such that each sample in the residual pixel block has a value equal to a difference between a sample in the pixel block of the CU and a corresponding sample in a selected predictive pixel block of a PU of the CU.

Prediction processing unit 100 may perform quad-tree partitioning to partition the residual pixel block of a CU into sub-blocks. Each undivided residual pixel block may be associated with a different TU of the CU. The sizes and positions of the residual pixel blocks associated with TUs of a CU may or may not be based on the sizes and positions of pixel blocks of the PUs of the CU.

Because the pixels of the residual pixel blocks of the TUs may comprise a luma sample and two chroma samples, each of the TUs may be associated with a block of luma samples and two blocks of chroma samples. Transform processing unit 104 may generate coefficient blocks for each TU of a CU by applying one or more transforms to the residual sample blocks associated with the TU. Transform processing unit 104 may apply various transforms to a residual sample block associated with a TU. For example, transform processing unit 104 may apply a discrete cosine transform (DCT), a directional transform, or a conceptually similar transform to a residual sample block.

Quantization unit 106 may quantize the coefficients in a coefficient block associated with a TU. The quantization process may reduce the bit depth associated with some or all of the coefficients. For example, an n-bit coefficient may be rounded down to an m-bit coefficient during quantization, where n is greater than m. Quantization unit 106 may quantize a coefficient block associated with a TU of a CU based on a quantization parameter (QP) value associated with the CU. Video encoder 20 may adjust the degree of quantization applied to the coefficient blocks associated with a CU by adjusting the QP value associated with the CU.

Inverse quantization unit 108 and inverse transform processing unit 110 may apply inverse quantization and inverse transforms to a coefficient block, respectively, to reconstruct a residual sample block from the coefficient block. Reconstruction unit 112 may add the reconstructed residual sample block to corresponding samples from one or more predictive sample blocks generated by prediction processing unit 100 to produce a reconstructed sample block associated with a TU. By reconstructing sample blocks for each TU of a CU in this way, video encoder 20 may reconstruct the pixel block of the CU.

Filter unit 113 may perform a deblocking operation to reduce blocking artifacts in the pixel block associated with a CU. Decoded picture buffer 114 may store the reconstructed pixel blocks after filter unit 113 performs the one or more deblocking operations on the reconstructed pixel blocks. Inter-prediction unit 121 may use a reference picture that contains the reconstructed pixel blocks to perform inter prediction on PUs of other pictures. In addition, intra-prediction processing unit 126 may use reconstructed pixel blocks in decoded picture buffer 114 to perform intra prediction on other PUs in the same picture as the CU.

Entropy encoding unit 116 may receive data from other functional components of video encoder 20. For example, entropy encoding unit 116 may receive coefficient blocks from quantization unit 106 and may receive syntax elements from prediction processing unit 100. Entropy encoding unit 116 may perform one or more entropy encoding operations on the data to generate entropy-encoded data. For example, entropy encoding unit 116 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data.

Video encoder 20 may output a bitstream that includes entropy-encoded data generated by entropy encoding unit 116. The bitstream may include a series of NAL units. The NAL units may include coded slice NAL units, SPS NAL units, PPS NAL units, and so on. To ensure that a picture does not include combinations of tiles, WPP waves, and entropy slices, the bitstream may include a syntax element that indicates whether the picture is encoded entirely using WPP or whether each tile of the picture is encoded without using WPP.

Figure 3:
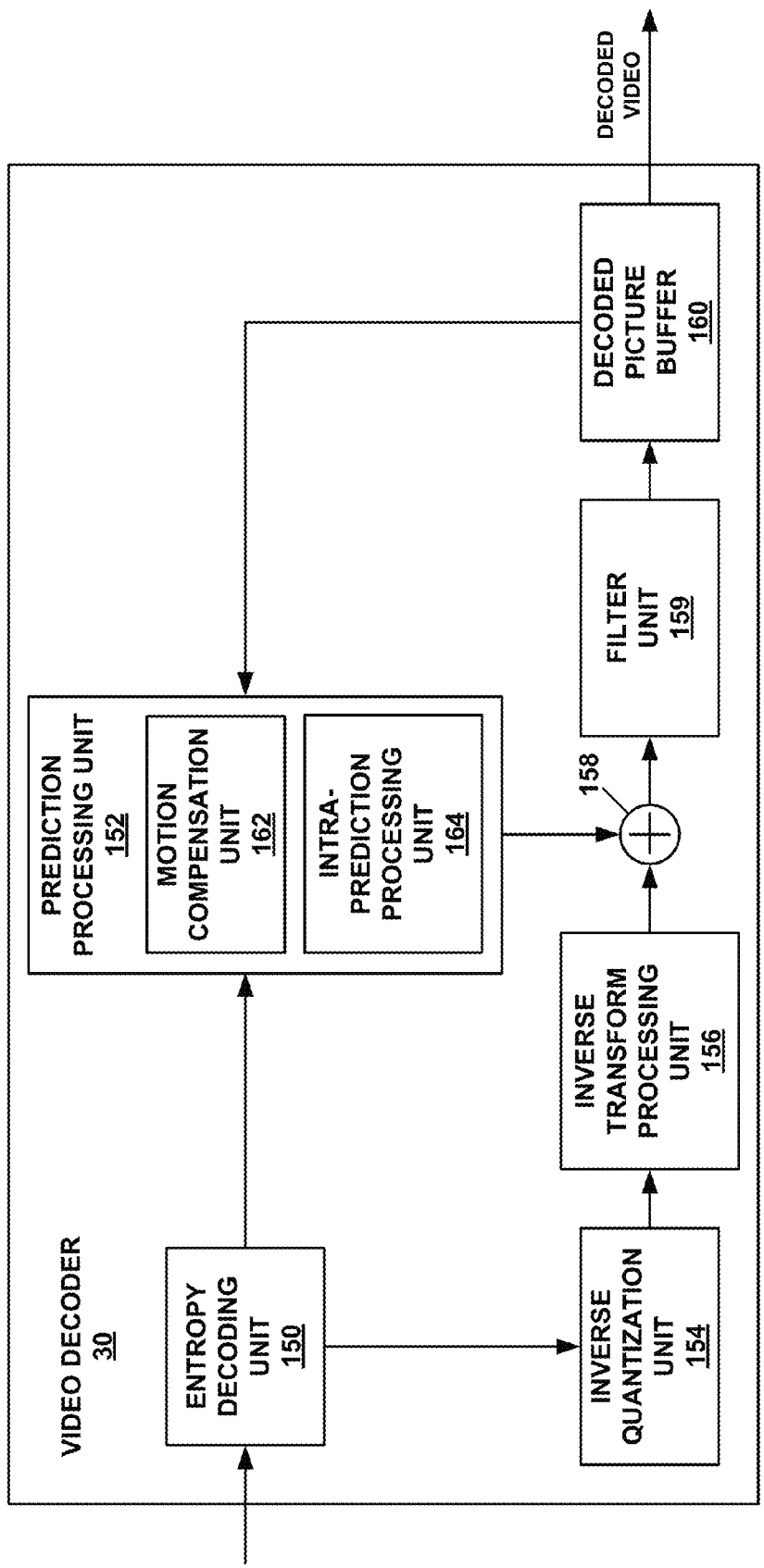
FIG. 3 is a block diagram illustrating an example video decoder that may implement the techniques described in this disclosure.

FIG. 3 is a block diagram that illustrates an example video decoder 30 that is configured to implement the techniques of this disclosure. FIG. 3 is provided for purposes of explanation and is not limiting on the techniques as broadly exemplified and described in this disclosure. For purposes of explanation, this disclosure describes video decoder 30 in the context of HEVC coding. However, the techniques of this disclosure may be applicable to other coding standards or methods.

In the example of FIG. 3, video decoder 30 includes an entropy decoding unit 150, a prediction processing unit 152, an inverse quantization unit 154, an inverse transform processing unit 156, a reconstruction unit 158, a filter unit 159, and a decoded picture buffer 160. Prediction processing unit 152 includes a motion compensation unit 162 and an intra-prediction processing unit 164. In other examples, video decoder 30 may include more, fewer, or different functional components.

Video decoder 30 may receive a bitstream. Entropy decoding unit 150 may parse the bitstream to extract syntax elements from the bitstream. As part of parsing the bitstream, entropy decoding unit 150 may entropy decode entropy-encoded syntax elements in the bitstream. Prediction processing unit 152, inverse quantization unit 154, inverse transform processing unit 156, reconstruction unit 158, and filter unit 159 may generate decoded video data based on the syntax elements extracted from the bitstream.

The bitstream may comprise a series of NAL units. The NAL units of the bitstream may include coded slice NAL units. As part of parsing the bitstream, entropy decoding unit 150 may extract and entropy decode syntax elements from the coded slice NAL units. Each of the coded slices may include a slice header and slice data. The slice header may contain syntax elements pertaining to a slice. The syntax elements in the slice header may include a syntax element that identifies a PPS associated with a picture that contains the slice.

In addition, video decoder 30 may perform a reconstruction operation on a non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual pixel block associated with the CU.

As part of performing a reconstruction operation on a TU of a CU, inverse quantization unit 154 may inverse quantize, i.e., de-quantize, coefficient blocks associated with the TU. Inverse quantization unit 154 may use a QP value associated with the CU of the TU to determine a degree of quantization and, likewise, a degree of inverse quantization for inverse quantization unit 154 to apply.

After inverse quantization unit 154 inverse quantizes a coefficient block, inverse transform processing unit 156 may apply one or more inverse transforms to the coefficient block in order to generate a residual sample block associated with the TU. For example, inverse transform processing unit 156 may apply an inverse DCT, an inverse integer transform, an inverse Karhunen-Loeve transform (KLT), an inverse rotational transform, an inverse directional transform, or another inverse transform to the coefficient block.

If a PU is encoded using intra prediction, intra-prediction processing unit 164 may perform intra prediction to generate a predictive sample block for the PU. Intra-prediction processing unit 164 may use an intra prediction mode to generate the predictive pixel block for the PU based on the pixel blocks of spatially-neighboring PUs. Intra-prediction processing unit 164 may determine the intra prediction mode for the PU based on one or more syntax elements parsed from the bitstream.

Motion compensation unit 162 may construct a first reference picture list (list 0) and a second reference picture list (list 1) based on syntax elements extract from the bitstream. Furthermore, if a PU is encoded using inter prediction, entropy decoding unit 150 may extract motion information for the PU. Motion compensation unit 162 may determine, based on the motion information of the PU, one or more reference blocks for the PU. Motion compensation unit 162 may generate, based on the one or more reference blocks for the PU, a predictive pixel block for the PU.

Reconstruction unit 158 may use the residual pixel blocks associated with TUs of a CU and the predictive pixel blocks of the PUs of the CU, i.e., either intra-prediction data or inter-prediction data, as applicable, to reconstruct the pixel block of the CU. In particular, reconstruction unit 158 may add samples of the residual pixel blocks to corresponding samples of the predictive pixel blocks to reconstruct the pixel block of the CU.

Filter unit 159 may perform a deblocking operation to reduce blocking artifacts associated with the pixel block of the CU. Video decoder 30 may store the pixel block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the pixel blocks in decoded picture buffer 160, intra prediction or inter prediction operations on PUs of other CUs.

As mentioned above, video decoder 30 may receive a bitstream that includes a coding mode syntax element. If the coding mode syntax element has a particular value, the coding mode syntax element indicates that a picture is entirely encoded using WPP. In various examples, the coding mode syntax element may be in various portions of the bitstream. For instance, a SPS may include a coding mode syntax element. Table 1, below, provides an example syntax for an SPS that includes a coding mode syntax element ("tile_mode").

TABLE 1

Sequence parameter set RBSP syntax

| seq_parameter_set_rbsp( ) { | Descriptor |
|---|---|
| ... | |
|   inter_4x4_enabled_flag | u(1) |
|   tile_mode // 0: only one tile in one picture; 1: uniform spacing; 2: non-uniform spacing; 3: WPP | u(2) |
|   if( tile_mode = = 1 \|\| tile_mode = = 2 ) { | |
|     num_tile_columns_minus1 | ue(v) |
|     num_tile_rows_minus1 | ue(v) |
|   } | |
|   if( tile_mode = = 2 ) { | |
|     for ( i = 0; i < num_tile_columns_minus1; i++ ) | |
|       column_width[ i ] | ue(v) |
|     for ( i = 0; i < num_tile_rows_minus1; i++ ) | |
|       row_height[ i ] | ue(v) |
|   } | |
|   if( tile_mode = = 1 \|\| tile_mode = = 2 ) { | |
|     tile_boundary_independence_flag | u(1) |
|     if( tile_boundary_independence_flag ) | |
|       loop_filter_across_tile_flag | u(1) |
|   } | |
|   rbsp_trailing_bits( ) | |
| } | |

Syntax elements with type descriptor ue(v) are unsigned variable-length values encoded using exponential-Golomb coding with left bit first. Syntax elements with type descriptor u(1) and u(2) are unsigned values that are 1 or 2 bits in length, respectively. In the example syntax of Table 1, the inter_4× 4_enabled_flag syntax element specifies whether inter prediction can be applied to blocks having the size of 4×4 luma samples.

Furthermore, in the example syntax of Table 1, the tile_mode syntax element specifies a tile_mode for pictures associated with the SPS. If the tile_mode syntax element is equal to 0, there is only one tile in each of the pictures associated with the SPS. The CTBs in the single tile of each picture are coded according to raster scan order without using WPP. If the tile_mode syntax element is equal to 1, the pictures associated with the SPS are in uniformly-spaced tile_mode. When a picture is in uniformly-spaced tile_mode, tile column boundaries and tile row boundaries are uniformly distributed in each picture associated with the SPS. As a result, when a picture is in uniformly-spaced tile_mode, the tiles of the picture have the same size. CTBs within each of the uniformly-distributed tiles may be encoded according to a raster scan order without using WPP. If the tile_mode syntax element is equal to 2, the pictures associated with the SPS are in non-uniformly-spaced tile_mode. When a picture is in the non-uniformly-spaced tile_mode, tile column boundaries and tile row boundaries are not distributed uniformly across the picture, but may be signaled explicitly using the column_width[i] and row_height[i] syntax elements of the SPS. CTBs within each of the non-uniformly-spaced tiles may be encoded according to a raster scan order without using WPP.

If the tile_mode syntax element is equal to 3, the pictures associated with the SPS are coded using WPP mode. In other words, if the tile_mode syntax element has a particular value (e.g., 3), the pictures associated with the SPS are entirely encoded using WPP. If the tile_mode syntax element has any value other than 3, no tile of any picture associated with the SPS is encoded using WPP. Furthermore, when a picture is coded using WPP, a specific memorization process is invoked after decoding two CTBs of a row of CTBs of the picture. In addition, a specific synchronization process is invoked before decoding the first CTB of a row of CTBs of the picture. In addition, a specific CABAC state re-initialization process of internal variables is invoked when the rightmost CTB of a row has been coded.

In the specific memorization process mentioned above, a video coder may, in response to determining that a first CTB is separated from a left boundary of a picture by a single CTB, store particular context variables associated with the first CTB. In the specific synchronization process, the video coder may entropy code (i.e., entropy encode or entropy decode), based at least in part on the context variables associated with the first CTB, one or more syntax elements of a second CTB, the second CTB being positioned adjacent to the left boundary of the picture and positioned one row of CTBs lower than the first CTB.

Furthermore, in the example syntax of Table 1, the num_tile_columns_minus1 syntax element specifies the number of tile columns partitioning each of the pictures associated with the SPS. When the tile_mode syntax element is equal to 0 or 3, the value of the num_tile_columns_minus1 syntax element may be inferred to be equal to 0. This is because there is only a single tile in a picture when the tile_mode syntax element is equal to 0, and each CTB row of the picture is a single tile when the tile_mode syntax element is equal to 3. The num_tile_rows_minus1 syntax element specifies the number of rows partitioning each of the pictures associated with the SPS. When the tile_mode syntax element is equal to 0, the value of the num_tile_rows_minus1 syntax element may be inferred to be equal to 0. When the tile_mode syntax element is equal to 3, video decoder 30 may automatically determine (i.e., infer) that the value of the num_tile_rows_minus1 syntax element is equal to the height of the pictures in CTBs, minus 1. Furthermore, when the tile_mode syntax element is equal to 1 or 2, at least one of the num_tile_columns_minus1 syntax element and the num_tile_rows_minus1 syntax element is greater than 0.

Video decoder 30 may determine, based on the column_width[i] syntax elements and the row_height[i] syntax elements, the widths and heights of tiles of the pictures associated with the SPS. The column_width[i] syntax elements indicate widths of tile columns of the pictures associated with the SPS. Video decoder 30 may generate, based at least in part on the column_width[i] syntax elements, a columnWidth vector that indicates the widths of columns of tiles in the pictures associated with the SPS. Video decoder 30 may use the following pseudo-code to generate the columnWidth vector from the column_width[i] syntax elements of the SPS.

```
for ( i = 0; i <= num_tile_columns_minus1; i++ ) {
    if ( tile_mode != 2 )
        columnWidth[i] =
            ( ( i+1 ) * PicWidthInLCUs) /
            ( num_tile_columns_minus1 + 1 ) –
            ( i * PicWidthInLCUs ) / ( num_tile_columns_minus1 +
            1 )
    else
        columnWidth[i] = column_width[i]
}
```

Video decoder 30 may generate a rowHeight vector that indicates the heights of tiles in the pictures associated with the SPS. In some examples, video decoder 30 may use the following pseudo-code to generate the rowHeight vector.

```
for ( i = 0; i <= num_tile_rows_minus1; i++ ) {
    if ( tile_mode != 2 )
        rowHeight[i] =
            ( ( i+1 ) * PicHeightInLCUs) /
            ( num_tile_rows_minus1 + 1 ) –
            ( i * PicHeightInLCUs ) / ( num_tile_rows_minus1 + 1 )
    else
        rowHeight[i] = row_width[i]
}
```

Furthermore, video decoder 30 may generate a colBd vector that indicates locations within the pictures associated with the SPS of the leftmost column boundary for each column of tiles. In some examples, video decoder 30 may determine the colBd vector using the following pseudo-code.

```
colBd[0] = 0
for ( i = 0; i <= num_tile_columns_minus1; i++ )
    colBd[i+1] = colBd[i] + columnWidth[i]
```

Video decoder 30 may generate a rowBd vector that indicates locations within the picture associated with the SPS of a top row boundary of each row of tiles. In some examples, video decoder 30 may determine the rowBd vector using the following pseudo-code.

```
rowBd[0] = 0
for ( i = 0; i <= num_tile_rows_minus1; i++ )
    rowBd[i+1] = rowBd[i] + rowHeight[i]
```

In the example syntax of Table 1, the tile_boundary_independence_flag syntax element indicates whether tiles are independently decodable. For example, if the tile_boundary_independence_flag is equal to 1, the tiles are independently decodable. For instance, if the tile_boundary_independence_flag is equal to 1 and video decoder 30 is decoding a particular CTB, all CTBs that neighbor the particular CTB that are not within the same tile as the particular CTB are determined to be unavailable for in-picture prediction. Furthermore, if the tile_boundary_independence_flag is equal to 1, video decoder 30 re-initializes an entropy coding context prior to entropy decoding the first CTB in a tile.

If the tile_boundary_independence_flag syntax element is equal to 0, the availability of CTBs for in-picture prediction is not affected by tile boundaries. In other words, if the tile_boundary_independent_flag syntax element is equal to 0, video decoder 30 may perform in-picture prediction across tile boundaries. Furthermore, if the tile_boundary_independence_flag syntax element is equal to 0, entropy decoding unit 150 may invoke a synchronization process when decoding the first CTB in a tile, except for the first treeblock in a picture. In this synchronization process, entropy decoding unit 150 may use information associated with a last CTB of a previous tile to select a coding context for entropy decoding one or more syntax elements of the first CTB in a tile. In addition, entropy decoding unit 150 may perform a memorization process when decoding the first CTB of the second CTB row in a tile. The memorization process may store context variables for use in selecting a context for CABAC coding one or more syntax elements of a leftmost CTB of the next lower row of CTBs.

If the tile_mode syntax element is equal to 0 (i.e., there is only one tile per picture), the SPS does not, in the example syntax of Table 1, include the tile_boundary_independence_flag syntax element. However, if the tile_mode syntax element is equal to 0, video decoder 30 may automatically determine that the value of the tile_boundary_independence_flag syntax element is equal to 1. Similarly, if the tile_mode syntax element is equal to 3 (i.e., the picture is entirely encoded using WPP), the SPS does not, in the example syntax of Table 1, include the tile_boundary_independence_flag syntax element. However, if the tile_mode syntax element is equal to 3, video decoder 30 may automatically determine that the value of the tile_boundary_independence_flag syntax element is equal to be 0.

In the example syntax of Table 1, the loop_filter_across_tile_flag syntax element specifies whether video decoder 30 is to perform in-loop filtering operations across tile boundaries. For example, if the loop_filter_across_tile_flag syntax element is equal to 1, video decoder 30 may perform in-loop filtering operations across tile boundaries. Otherwise, if the loop_filter_across_tile_flag syntax element is equal to 0, video decoder 30 may not perform the in-loop filtering operations across tile boundaries. Example in-loop filtering operations may include deblocking filters, sample adaptive offsets, and adaptive loop filters.

If the tile_mode syntax element is equal to 0 (i.e., there is only one tile per picture) or equal to 3 (i.e., each picture associated with the SPS is encoded entirely using WPP), the SPS does not, in the example syntax of Table 1, include the loop_filter_across_tile_flag syntax element. However, if the tile_mode syntax element is equal to 0, video decoder 30 may automatically determine that the value of the loop_filter_across_tile_flag syntax element is equal to 0. If the tile_mode syntax element is equal to 3, video decoder 30 may automatically determine that the value of the loop_filter_across_tile_flag syntax element is equal to 1.

Alternatively, or in addition to receiving a SPS that includes a coding mode syntax element, video decoder 30 may receive a PPS that includes a coding mode syntax element. In some examples where video decoder 30 receives an SPS and a PPS that apply to the same picture and both the SPS and the PPS include coding mode syntax elements, video decoder 30 may give priority to the coding mode syntax element specified by the PPS. Table 2, below, presents an example syntax of a PPS that includes a coding mode syntax element ("tile_mode").

TABLE 2

Picture parameter set RBSP syntax

| pic_parameter_set_rbsp( ) { | Descriptor |
|---|---|
|   pic_parameter_set_id | ue(v) |
|   seq_parameter_set_id | ue(v) |
|   num_temporal_layer_switching_point_flags | ue(v) |
|   for( i = 0; i < num_temporal_layer_switching_point_flags; i++ ) | |
|     temporal_layer_switching_point_flag[ i ] | u(1) |
|   num_ref_idx_l0_default_active_minus1 | ue(v) |
|   num_ref_idx_l1_default_active_minus1 | ue(v) |
|   pic_init_qp_minus26 / relative to 26 / | se(v) |
|   constrained_intra_pred_flag | u(1) |
|   slice_granularity | u(2) |
|   max_cu_qp_delta_depth | ue(v) |
|   weighted_pred_flag | u(1) |
|   weighted_bipred_idc | u(2) |
|   tile_partition_info_present_flag | u(1) |
|   if( tile_partition_info_present_flag == 1 ) { | |
|     tile_mode // 0: only one tile in one picture; 1: uniform spacing; 2: non-uniform spacing; 3: WPP | u(2) |
|     if( tile_mode == 1 || tile_mode == 2 ) { | |
|       num_tile_columns_minus1 | ue(v) |
|       num_tile_rows_minus1 | ue(v) |
|     } | |
|     if( tile_mode == 2 ) { | |
|       for( i = 0; i < num_tile_columns_minus1; i++ ) | |
|         column_width[ i ] | ue(v) |
|       for( i = 0; i < num_tile_rows_minus1; i++ ) | |
|         row_height[ i ] | ue(v) |
|     } | |
|   } | |

TABLE 2-continued

Picture parameter set RBSP syntax

| pic_parameter_set_rbsp( ) { | Descriptor |
|---|---|
|   if( tile_mode = = 1 \|\| tile_mode = = 2 ) { | |
|     tile_control_info_present_flag | u(1) |
|     if( tile_control_info_present_flag = = 1 ) { | |
|       tile_boundary_independence_flag | u(1) |
|       if( tile_boundary_independence_flag ) | |
|         loop_filter_across_tile_flag | u(1) |
|     } | |
|   } | |
|   if( tile_mode = = 0 ) | |
|     entropy_slice_enabled_flag | u(1) |
|   rbsp_trailing_bits( ) | |
| } | |

In the example syntax of Table 2, if the tile_partition_info_present_flag syntax element is equal to 1, the tile_mode syntax element is present. In addition, if the tile_partition_info_present_flag syntax element is equal to 1, the num_tile_columns_minus1, num_tile_rows_minus1, column_width [i], and row_height[i] syntax elements may be present in the PPS. The semantics of the tile_mode syntax element, the num_tile_columns_minus1 syntax element, the num_tile_rows_minus1 syntax element, the column_width syntax elements, and the row_height syntax elements may be the same as those described above with regard to the example SPS syntax of Table 1. If the tile_partition_info_present_flag syntax element is equal to 0, the tile_mode, num_tile_columns_minus1, num_tile_rows_minus1, column_width[i], and row_height[i] syntax elements are not present in the PPS.

In this way, video decoder 30 may determine, based at least in part on the coding mode syntax element (e.g., tile_mode) having a value that indicates that no CTB of the picture is encoded using WPP, that a parameter set (e.g., a SPS or a PPS) includes a tile column number syntax element and a tile row number syntax element. Video decoder 30 may also determine, based on the tile column number syntax element, the number of tile columns. The number of columns of tiles of each picture associated with the parameter set may be equal to the number of tile columns. Video decoder 30 may also determine, based on the tile row number syntax element, the number of tile rows. The number of rows of tiles of each picture associated with the parameter set may be equal to the number of tile rows. Furthermore, video decoder 30 may determine that a parameter set (e.g., a SPS or a PPS) includes a series of one or more column width syntax elements and a series of one or more tiles height syntax elements. In addition, video decoder 30 may determine, based at least in part on the column width syntax elements, widths of the columns of tiles of each picture associated with the parameter set. Furthermore, video decoder 30 may determine, based at least in part on the tile height syntax elements, heights of tiles of each picture associated with the parameter set.

Similarly, video encoder 20 may generate a parameter set that includes a tile column number syntax element and a tile row number syntax element. The parameter set may be a picture parameter set (PPS) or a sequence parameter set (SPS). The number of tile columns is determinable based on the tile column number syntax element and the number of columns of tiles of each picture associated with the parameter set is equal to the number of tile columns. The number of tile rows is determinable based on the tile row number syntax element and the number of rows of tiles of each picture associated with the parameter set is equal to the number of tile rows. When video encoder 20 generates the parameter set, video encoder 20 may generate a series of one or more column width syntax elements and a series of one or more row height syntax elements. Widths of the columns of tiles of each picture associated with the parameter set may be determinable based at least in part on the column width syntax elements. The heights of the rows of tiles of each picture associated with the parameter set may be determinable based at least in part on the row height syntax elements.

Furthermore, in the example syntax of Table 2, if the tile_control_info_present_flag syntax element is equal to 1, the tile_boundary_independence_flag and loop_filter_across_tile_flag syntax elements may be present in the PPS. If the tile_control_info_present_flag syntax element is equal to 0, the tile_boundary_independence_flag and loop_filter_across_tile_flag syntax elements are not present in the PPS.

In the example syntax of Table 2, if the entropy_slice_enabled_flag is equal to 1, coded slices that refer to the PPS may include (and may consist of) one or more entropy slices. If the entropy_slice_enabled_flag syntax element is equal to 0, coded slices that refer to the PPS do not contain entropy slices. When the entropy_slice_enabled_flag syntax element is not present, video decoder 30 may automatically determine (i.e., infer) that the entropy_slice_enabled_flag syntax element is equal to 0. The semantics for other syntax elements of the PPS may be the same as the semantics defined in HEVC WD5.

In the example syntax of Table 2, the PPS only includes the entropy_slice_enabled_flag syntax element if the tile_mode syntax element is equal to 0. As discussed above, video decoder 30 may determine, based on the tile_mode syntax element, whether to use WPP to decode the CTBs of each tile of a picture. Thus, video decoder 30 may determine, based on a coding mode syntax element (e.g., tile_mode) having a particular value, that the bitstream includes an additional syntax element (e.g., entropy_slice_enabled_flag) that indicates whether entropy slices are enabled for encoded representations of pictures that refer to a parameter set (e.g., a SPS or a PPS) that includes the coding mode syntax element and the additional syntax element.

As described above, a coded slice NAL unit may include a coded representation of a slice. The coded representation of the slice may include a slice header followed by slice data. In some examples, video decoder 30 may determine, based at least in part on a coding mode syntax element (e.g., tile_mode), whether the slice header includes a plurality of entry offset syntax elements from which entry points of substreams in the slice data are determinable. In response to determining that the slice header includes the entry offset syntax elements, video decoder 30 may use the plurality of entry offset syntax elements to determine entry points of sub-streams in the slice data. In other words, video decoder 30 may determine, based at least in part on the offset syntax elements, positions in memory of the sub-streams. If the coding mode syntax element has a value (e.g., 3), each row of CTBs of the picture is represented by a single one of the sub-streams. If the coding mode syntax element has a different value (e.g., 0, 1, or 2), each tile of the picture that has one or more CTBs in the slice is represented by a single one of the sub-streams. The slice header may conform to the example syntax of Table 3, below.

TABLE 3

Slice header syntax

| slice_header( ) { | Descriptor |
|---|---|
|   first_slice_in_pic_flag | u(1) |
|   if( first_slice_in_pic_flag == 0 ) | |
|     slice_address | u(v) |
|   slice_type | ue(v) |
|   pic_parameter_set_id | ue(v) |
|   if( sample_adaptive_offset_enabled_flag \|\| | |
|   adaptive_loop_filter_enabled_flag ) | |
|     aps_id | ue(v) |
|   frame_num | u(v) |
|   if( IdrPicFlag ) | |
|     idr_pic_id | ue(v) |
|   if( pic_order_cnt_type == 0 ) | |
|     pic_order_cnt_lsb | u(v) |
|   if( slice_type == P \|\| slice_type == B ) { | |
|     num_ref_idx_active_override_flag | u(1) |
|     if( num_ref_idx_active_override_flag ) { | |
|       num_ref_idx_l0_active_minus1 | ue(v) |
|       if( slice_type == B ) | |
|         num_ref_idx_l1_active_minus1 | ue(v) |
|     } | |
|   } | |
|   ref_pic_list_modification( ) | |
|   ref_pic_list_combination( ) | |
|   if( nal_ref_flag ) | |
|     dec_ref_pic_marking( ) | |
|   if( slice_type != I ) | |
|     cabac_init_idc | ue(v) |
|   slice_qp_delta | se(v) |
|   disable_deblocking_filter_flag | u(1) |
|   if( slice_type == B ) | |
|     collocated_from_l0_flag | u(1) |
|   if( adaptive_loop_filter_enabled_flag && | |
|   aps_adaptive_loop_filter_flag ) { | |
|     byte_align( ) | |
|     alf_cu_control_param( ) | |
|     byte_align( ) | |
|   } | |
|   if( ( weighted_pred_flag && slice_type == P ) \|\| | |
|     ( weighted_bipred_idc == 1 && slice_type == B ) ) | |
|     pred_weight_table( ) | |
|   if( slice_type == P \|\| slice_type == B ) | |
|     5_minus_max_num_merge_cand | ue(v) |
|   if( tile_mode != 0 \|\| entropy_slice_enabled_flag ) { | |
|     num_entry_offsets | ue(v) |
|     if( num_entry_offsets ) { | |
|       offset_len_minus8 | ue(v) |
|       for( i = 0; i < num_entry_offsets; i++ ) | |
|         entry_offset[ i ] | u(v) |
|     } | |
|   } | |
|   if( entropy_slice_enabled_flag && num_entry_offsets ) | |
|     for( i = 0; i < num_entry_offsets; i++ ) { | |
|       entropy_slice_address[ i ] | u(v) |
|       if( slice_type != I ) | |
|         entropy_slice_cabac_init_idc[ i ] | ue(v) |
|     } | |
| } | |

In the example syntax of Table 3, the value of the slice header syntax elements "pic_parameter_set_id," "frame_num," "idr_pic_id," "pic_order_cnt_lsb," "delta_pic_order_cnt[0]," and "delta_pic_order_cnt[1]" are the same in all slice headers of a coded picture. Furthermore, in the example syntax of Table 3, the first_slice_in_pic_flag syntax element indicates whether the slice includes a CU that covers a top-left luma sample of the picture. If the first_slice_in_pic_flag syntax element is equal to 1, video decoder 30 may set both the variables SliceAddress and LCUAddress to 0 and video decoder 30 may start the decoding with the first CTB in the picture.

Furthermore, in the example syntax of Table 3, the slice_address syntax element specifies, in slice granularity resolution, an address in which the slice starts. The slice granularity resolution is the granularity with which the slice is defined. The number of bits of the slice_address syntax element may be equal to (Ceil(Log 2(NumLCUsInPicture))+SliceGranularity), where "NumLCUsInPicture" is the number of CTBs in a picture.

In the example syntax of Table 3, video decoder 30 sets the LCUAddress variable to (slice_address>>SliceGranularity). The LCUAddress variable indicates the LCU part of the slice address of the slice in raster scan order. Video decoder 30 sets the GranularityAddress variable to (slice_address−(LCUAddress<<SliceGranularity)). The GranularityAddress variable represents the sub-LCU part of the slice address. The GranularityAddress variable is expressed in z-scan order.

Video decoder 30 sets the SliceAddress variable to (LCUAddress<<(log 2_diff_max_min_coding_block_size<<1))+(GranularityAddress<<((log 2_diff_max_min_coding_block_size<<1)−SliceGranularity)). The value log 2_diff_max_min_coding_block_size specifies a difference between a maximum and minimum CU size. Video decoder 30 may start decoding the slice with the largest CU possible at the slice starting coordinate. The slice starting coordinate may be a coordinate of a top-left pixel of a first CU of the slice.

Furthermore, in the example syntax of Table 3, the cabac_init_idc syntax specifies an index for determining an initialization table used in the initialization process for context variables. The value of the cabac_init_idc syntax element may be in the range of 0 to 2, inclusive.

In the example syntax of Table 3, the num_entry_offsets syntax element specifies the number of entry_offset[i] syntax elements in the slice header. In other words, the number of entry offset syntax elements in the plurality of entry offset syntax elements is determinable based on the num_entry_offsets syntax element. When the num_entry_offsets syntax element is not present, video decoder 30 may determine that the value of the num_entry_offsets syntax element is equal to 0. In this way, video decoder 30 may determine, based on the num_entry_offsets syntax element, how many offset syntax elements are in the plurality of entry offset syntax elements. The offset_len_minus8 syntax element, plus 8, specifies the length, in bits, of the entry_offset[i] syntax elements. In other words, a length, in bits, of each of the entry offset syntax elements is determinable based on the offset_len_minus8 syntax element. In this way, video decoder 30 may determine, based on the offset_len_minus8 syntax element, a length, in bits, of the offset syntax elements. The entry_offset[i] syntax element specifies the i-th entry offset, in bytes.

Video decoder 30 may parse, based at least in part on how many offset syntax elements are in the plurality of offset syntax elements and the length, in bits, of the offset syntax elements, the offset syntax elements from the bitstream. The number of sub-streams in the coded slice NAL unit may be equal to num_entry_offsets+1. Index values of the sub-streams may be in the range of 0 to num_entry_offsets, inclusive. Sub-stream 0 of the coded slice NAL unit may consist of bytes 0 to entry_offset[0]−1, inclusive, of the slice data of the coded slice NAL unit. Sub-stream k of the coded slice NAL unit, with k in the range of 1 to num_entry_offsets−1, inclusive, may consist of bytes entry_offset[k−1] to entry_offset[k]−1, inclusive, of the slice data of the coded slice NAL unit. The last sub-stream of the coded slice NAL unit (with substream index equal to num_entry_offsets) may consist of the rest of the bytes of the slice data of the coded slice NAL unit.

In the example syntax of Table 3, if the tile_mode syntax element is greater than 0, each sub-stream with a sub-stream index in the range of 1 to num_entry_offsets−1 contains each coded bit of one tile and the sub-stream with sub-stream index 0 contains either each coded bit of a tile or a number of the ending coded bits of a tile. The ending coded bits of the tile are the coded bits coded at the end of the tile. Furthermore, if the tile_mode syntax element is greater than 0, the last sub-stream (i.e., the sub-stream with sub-stream index equal to num_entry_offsets) contains either all coded bits of a tile or the number of the starting coded bits of a tile. The starting coded bits of the tile are the coded bits coded at the start of the tile. A sub-stream does not contain coded bits of more than one tile. In the example syntax of Table 3, the NAL unit header and the slice header of a coded slice NAL unit are always included in sub-stream 0. If the tile_mode syntax element is equal to 0 and the entropy_slice_enabled_flag syntax element is equal to 1, each sub-stream contains each coded bit of one entropy slice and does not contain any coded bits of another entropy slice.

In the example syntax of Table 3, the entropy_slice_address[i] syntax element specifies a start address, in slice granularity resolution, of the (i+1)-th entropy slice in the coded slice NAL unit. The size in bits of each of the entropy_slice_address[i] syntax elements may be equal to (Ceil(Log 2(NumLCUsInPicture))+SliceGranularity).

Furthermore, in the example syntax of Table 3, the "entropy_slice_cabac_init_idc[i]" syntax element specifies an index for determining an initialization table used in an initialization process for context variables for the (i+1)-th entropy slice in the coded slice NAL unit. The value of the entropy_slice_cabac_init_idc[i] is in the range of 0 to 2, inclusive. Semantics for other syntax elements of the slice header may be the same as the semantics defined in HEVC WD5.

In some examples, the entry_offset[i] syntax elements indicate offsets of sub-streams in terms of bits. Moreover, in some examples, a slice header may include a flag that indicates whether the unit of "entry_offset[i]" is bytes (when equal to 1) or bits (when equal to 0). This flag may be located in the slice header after the offset_len_minus8 syntax element.

Furthermore, in some examples, a slice header may include a syntax element for each sub-stream, including sub-stream 0, to indicate a sub-stream type of the respective sub-stream. In this example, if the syntax element for a sub-stream has a first value, the sub-stream is a tile. If the syntax element for a sub-stream has a second value, the sub-stream is an entropy slice.

As mentioned above, a coded representation may include a slice header and slice data. The slice data may include one or more sub-streams. If the coding mode syntax element has a first value (e.g., 3), each row of CTBs of the picture is represented by a single one of the sub-streams. If the syntax element has a second value (e.g., 0, 1, or 2), each tile of the picture that has one or more CTBs in the slice is represented by a single one of the sub-streams. To facilitate WPP or decoding tiles of the slice in parallel, the sub-streams in the slice data may include padding bits that ensure byte alignment of the sub-streams. However, in instances where there is only one tile in a picture and entropy slices are not enabled, there may be no need to include such padding bits. Accordingly, video decoder 30 may determine, based at least in part on the coding mode syntax element (e.g., tile_mode) whether sub-streams in the slice data include padding bits that ensure byte alignment of the sub-streams.

The slice data may conform to the example syntax of Table 4, below.

TABLE 4

Slice data syntax

| slice_data( ) { | Descriptor |
|---|---|
|   CurrTbAddr = LCUAddress | |
|   moreDataFlag = 1 | |
|   if( adaptive_loop_filter_flag && alf_cu_control_flag ) | |
|     AlfCuFlagIdx = −1 | |
|   subStreamIdx = 0 | |
|   do { | |
|     xCU = HorLumaLocation( CurrTbAddr ) | |
|     yCU = VerLumaLocation( CurrTbAddr ) | |
|     moreDataFlag = coding_tree( xCU, yCU, Log2TbSize, 0 ) | |
|     CurrTbAddr = NextTbAddress( CurrTbAddr ) | |
|     if( tile_mode != 0 \|\| entropy_slice_enabled_flag ) { | |
|       byteIdx = byte_index( ) | |
|       if( byte_aligned( ) && byteIdx = = entry_offset[ subStreamIdx ]) | |
|         subStreamIdx++ | |
|       else if( !byte_aligned( ) && byteIdx = = entry_offset[ subStreamIdx ] − 1 ) { | |
|         while( !byte_aligned( ) ) | |
|           bit_equal_to_one | f(1) |
|         subStreamIdx++ | |
|       } | |
|       moreDataFlag = moreDataFlag && (subStreamIdx = = num_entry_offsets ) | |
|     } | |
|   } while( moreDataFlag ) | |
| } | |

In the example syntax of Table 4, the slice data includes a coding_tree( ) function. When video decoder 30 parses the slice data, video decoder 30 may perform a loop. During each iteration of the loop, video decoder 30 invokes the coding_tree( ) function to parse a coded CTB in the slice data. When video decoder 30 invokes the coding_tree( ) function to parse a particular coded CTB, video decoder 30 may parse an end_of_slice_flag syntax element from the slice data. If the end_of_slice_flag syntax element is equal to 0, there is another CTB following the particular coded CTB in the slice or the entropy slice. If the end_of_slice_flag syntax element is equal to 1, the particular coded CTB is the last coded CTB of the slice or the entropy slice.

Furthermore, the example syntax of Table 4 includes a byte_index( ) function. The byte_index( ) function may return a byte index of a current position within bits of the NAL unit. The current position within the bits of the NAL unit may be a first unparsed bit of the NAL unit. If a next bit in the bitstream is any bit of the first byte of a NAL unit header, the byte_index( ) function returns a value equal to 0.

The slice data syntax of Table 4 is an example. In other example of slice data syntaxes, the condition "if (tile_mode!=0\|\|entropy_slice_enabled_flag)" of Table 4 is replaced with the condition "if(tile_mode==1\|\|tile_mode==2\|\|entropy_slice_enabled_flag)."

Figure 4:
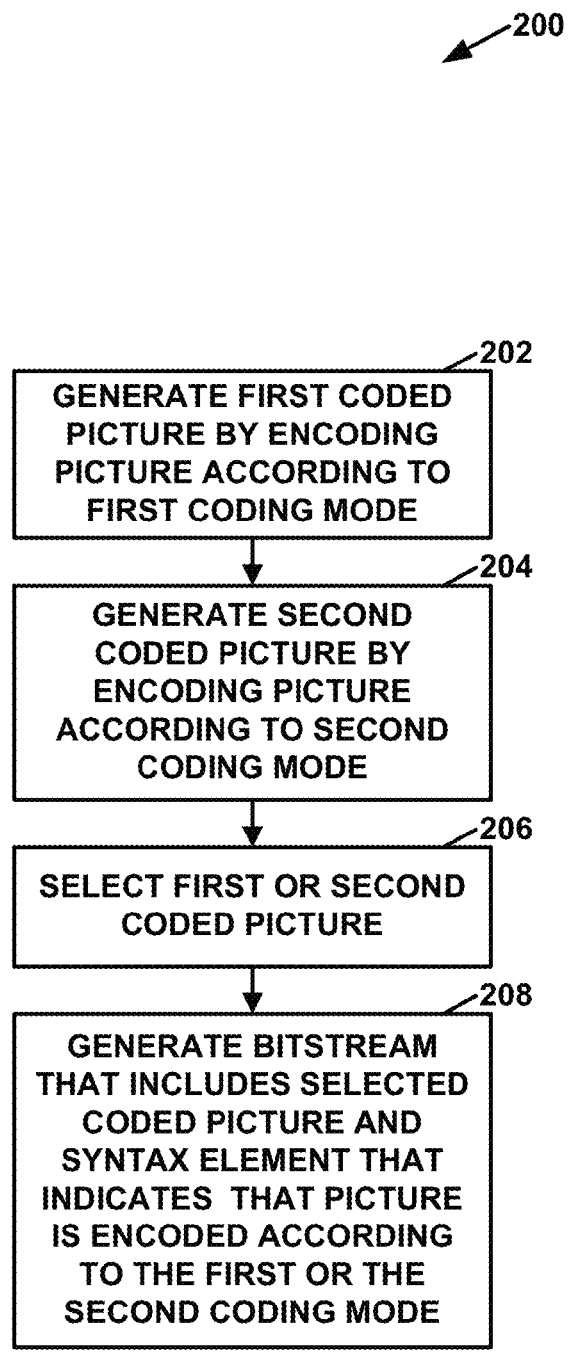
FIG. 4 is a flowchart illustrating an example operation of a video encoder for encoding video data in which combinations of tiles and wavefront parallel processing (WPP) within a single picture are disallowed, in accordance with one or more aspects of this disclosure.

FIG. 4 is a flowchart illustrating an example operation 200 of video encoder 20 for encoding video data in which combinations of tiles and WPP waves within a single picture are disallowed, in accordance with one or more aspects of this disclosure. FIG. 4 is provided as an example. In other examples, the techniques of this disclosure may be implemented using more, fewer, or different steps than those shown in the example of FIG. 4.

In the example of FIG. 4, video encoder 20 generates a first coded picture by encoding a picture according to a first coding mode (202). When video encoder 20 encodes the picture according to the first coding mode, the picture is entirely encoded using WPP. In addition, video encoder 20 may generate a second coded picture by encoding the picture according to a second coding mode (204). When video encoder 20 encodes the picture according to the second coding mode, video encoder 20 may partition the picture into one or more tiles. Video encoder 20 may encode each tile of the picture (i.e., encode each CTB in each of the tiles) without using WPP. For instance, video encoder 20 may encode the CTBs of each of the tiles according to a raster scan order without using WPP. Video encoder 20 may then select the first coded picture or the second coded picture (206). In some examples, video encoder 20 may select the first coded picture or the second coded picture based on a rate/distortion analysis of the first and second coded pictures. Video encoder 20 may generate a bitstream that includes the selected coded picture and a syntax element that indicates whether the picture is encoded according to either the first coding mode or the second coding mode (208).

Figure 5:
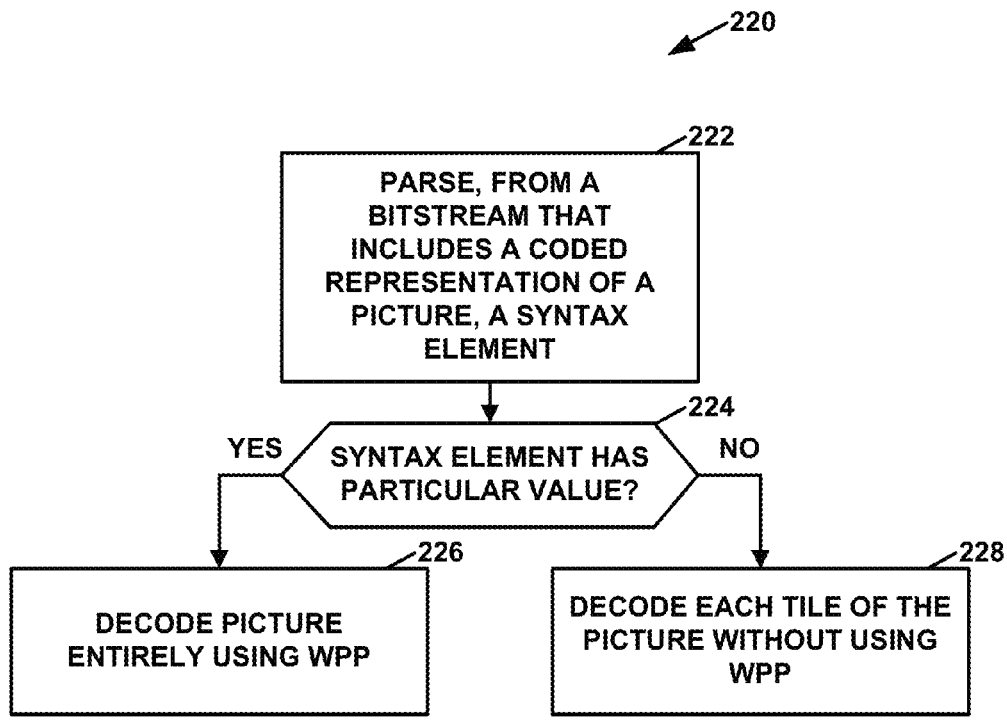
FIG. 5 is a flowchart illustrating an example operation of a video decoder for decoding video data in which combinations of tiles and WPP within a single picture are disallowed, in accordance with one or more aspects of this disclosure.

FIG. 5 is a flowchart illustrating an example operation 220 of video decoder 30 for decoding video data in which combinations of tiles and WPP within a single picture is disallowed, in accordance with one or more aspects of this disclosure. FIG. 5 is provided as an example.

In the example of FIG. 5, video decoder 30 may parse, from a bitstream that includes a coded representation of a picture in the video data, a syntax element (222). Video decoder 30 may determine whether the syntax element has a particular value (224). In response to determining that the syntax element has the particular value ("YES" of 224), video decoder 30 may decode the picture entirely using WPP (226). In response to determining that the syntax element does not have the particular value ("NO" of 224), video decoder 30 may decode each tile of the picture without using WPP, wherein the picture has one or more tiles (228).

Figure 6:
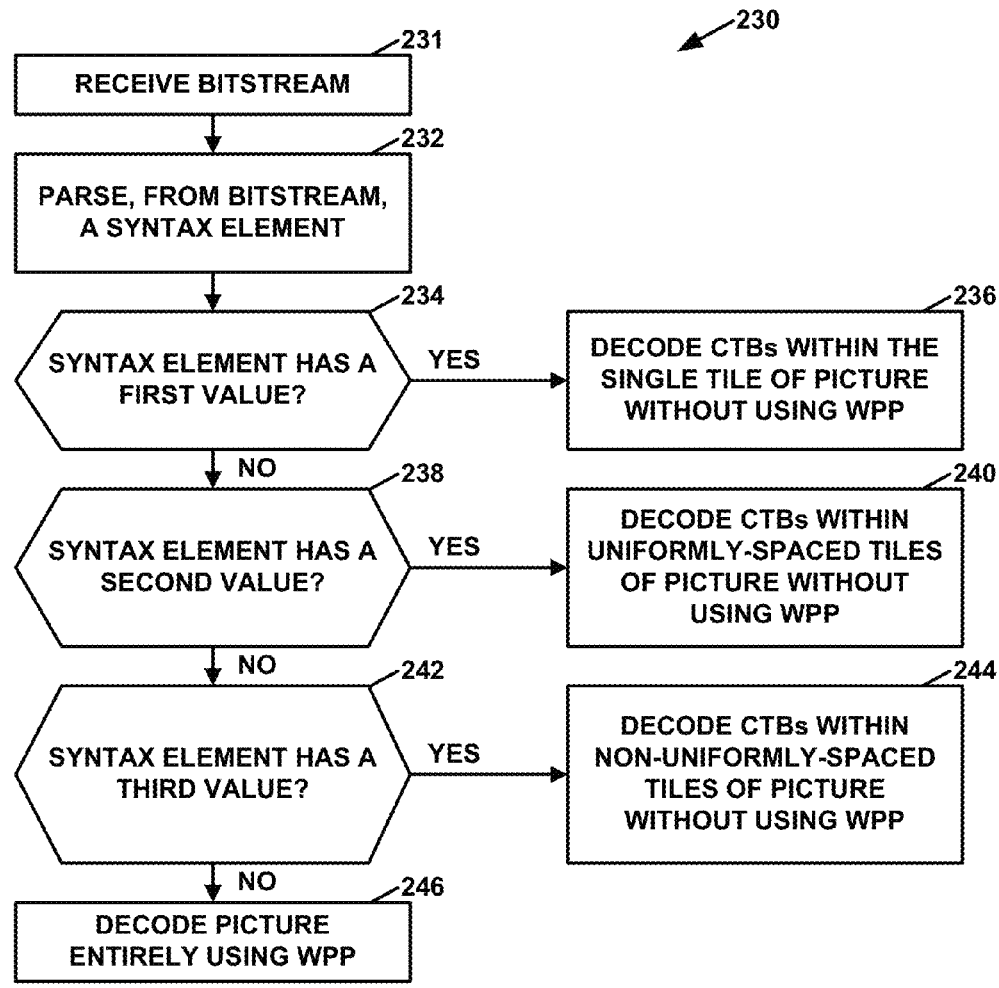
FIG. 6 is a flowchart illustrating another example operation of a video decoder for decoding video data in which combinations of tiles and WPP within a single picture are disallowed, in accordance with one or more aspects of this disclosure.

FIG. 6 is a flowchart illustrating an example operation 230 of video decoder 30 for decoding video data in which combinations of tiles and WPP within a single picture is disallowed, in accordance with one or more aspects of this disclosure. FIG. 6 is provided as an example. In other examples, the techniques of this disclosure may be implemented using more, fewer, or different steps than those shown in the example of FIG. 6. FIG. 6 may be a more specific example of operation 220 of FIG. 5.

In the example of FIG. 6, video decoder 30 receives a bitstream (231). Video decode 30 may parse, from the bitstream, a syntax element (232). In some examples, the bitstream includes a SPS that includes the syntax element. In other examples, the bitstream includes a PPS that includes the syntax element.

Subsequently, video decoder 30 may determine whether the syntax element has a first value, e.g., 0 (234). In the example of FIG. 6, if the syntax element has the first value ("YES" of 234), the picture has a single tile and video decoder 30 may decode the single tile of the picture without using WPP (236).

However, if the syntax element does not have the first value ("NO" of 234), video decoder 30 may determine whether the syntax element has a second value, e.g., 1 (238). In response to determining that the syntax element has the second value ("YES" of 238), video decoder 30 may determine that the picture has multiple uniformly-spaced tiles and video decoder 30 may decode each of the uniformly-spaced tiles without using WPP (238).

On the other hand, if the syntax element does not have the second value ("NO" of 238), video decoder 30 may determine whether the syntax element has a third value, e.g., 2 (242). In response to determining that the syntax element has the third value ("YES" of 242), video decoder 30 may determine that the picture has multiple non-uniformly spaced tiles and video decoder 30 may decode the non-uniformly-spaced tiles of the picture without using WPP (244). However, in response to determining that the syntax element does not have the third value ("NO" of 242), video decoder 30 may decode the picture entirely using WPP (246). In this way, if the syntax element has a first value (e.g., 3), the picture is entirely encoded using WPP and if the syntax element has a second value different from the first value (e.g., 0, 1, or 2), the picture is partitioned into one or more tiles and the picture is encoded without using WPP.

Figure 7:
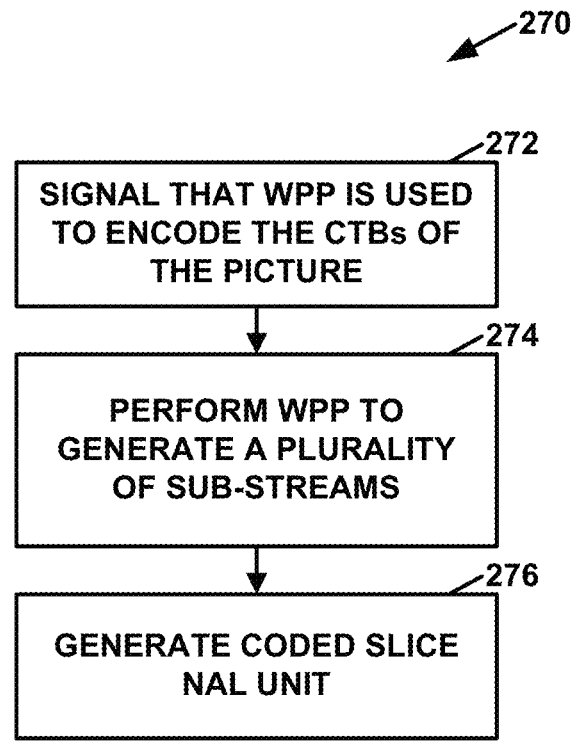
FIG. 7 is a flowchart illustrating an example operation of a video encoder for encoding video data in which each row of coding tree blocks (CTBs) of a picture is in a separate sub-stream, in accordance with one or more aspects of this disclosure.

FIG. 7 is a flowchart illustrating an example operation 270 of video encoder 20 for encoding video data in which each row of CTBs of a picture is in a separate sub-stream, in accordance with one or more aspects of this disclosure. In some video coding systems, there are different ways of signaling entry points for tiles and WPP waves. This may add complexity to these video coding systems. The techniques of this disclosure, and as explained with regard to FIGS. 7 and 8, may resolve these issues by providing a unified syntax for indicating entry points of tiles, WPP waves, and, in some examples, entropy slices.

In the example of FIG. 7, video encoder 20 signals that WPP is used to encode a picture of a sequence of video pictures (272). Video encoder 20 may signal in various ways that WPP is used to encode the picture. For example, video encoder 20 may generate a SPS that includes a syntax element (e.g., "tile_mode") that indicates whether WPP is to be used to entirely decode the picture. In another example, video encoder 20 may generate a PPS that includes a syntax element (e.g., "tile_mode") that indicates whether WPP is to be used to decode the picture.

Furthermore, video encoder 20 may perform WPP to generate a plurality of sub-streams (274). Each of the sub-streams may include a consecutive series of bits that represents one encoded row of CTBs in a slice of the picture. Thus, each row of CTBs is encoded as one sub-stream. Video encoder 20 may generate a coded slice NAL unit that includes the plurality of sub-streams (276). The coded slice NAL unit may include a slice header and slice data that conform to the example syntaxes of Tables 3 and 4, above.

Figure 8:
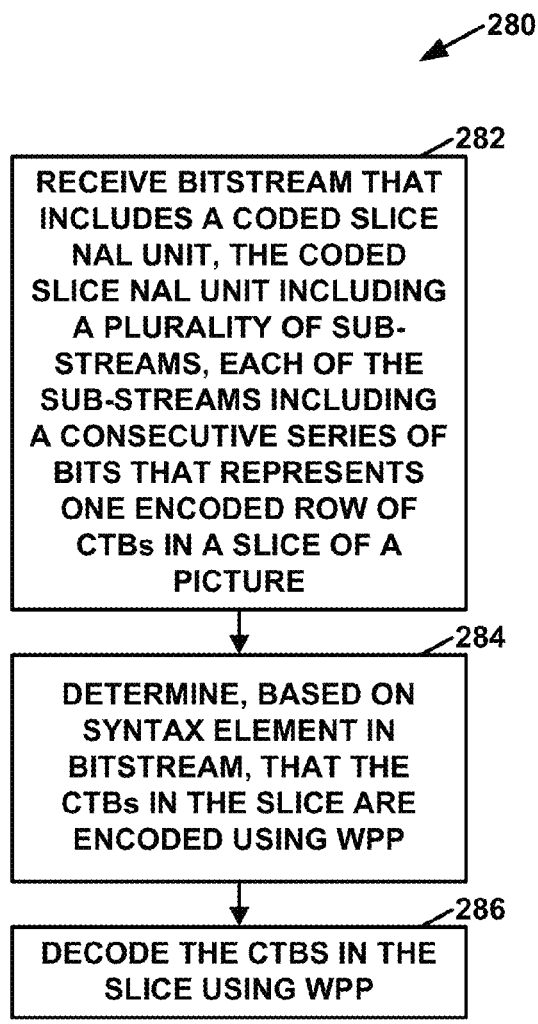
FIG. 8 is a flowchart illustrating an example operation of a video decoder for decoding video data in which each row of CTBs of a picture is in a separate sub-stream, in accordance with one or more aspects of this disclosure.

FIG. 8 is a flowchart illustrating an example operation 280 of video decoder 30 for decoding video data in which each row of CTBs of a picture is in a separate sub-stream, in accordance with one or more aspects of this disclosure. In the example of FIG. 8, video decoder 30 receives a bitstream that includes a coded slice NAL unit (282). The coded slice NAL unit includes a plurality of sub-streams. Each of the sub-streams may include a consecutive series of bits that represents one row of CTBs in a slice of a picture. Furthermore, in the example of FIG. 8, video decoder 30 determines, based on one or more syntax elements in the bitstream, that the slice is encoded using WPP (284). For example, video decoder 30 may determine, based on a tile_mode syntax element being equal to 3, that the slice is encoded using WPP. In this example, if the tile_mode syntax element is not equal to 3, video decoder 30 may decode each of the one or more tiles of the picture without using WPP.

Next, video decoder 30 may decode the slice using WPP (286). When video decoder 30 decodes the slice, video decoder 30 may parse syntax elements associated with the CTBs of the slice. Video decoder 30 may perform a CABAC parsing process on some of the syntax elements as part of parsing the syntax elements associated with the CTBs.

Figure 9A:
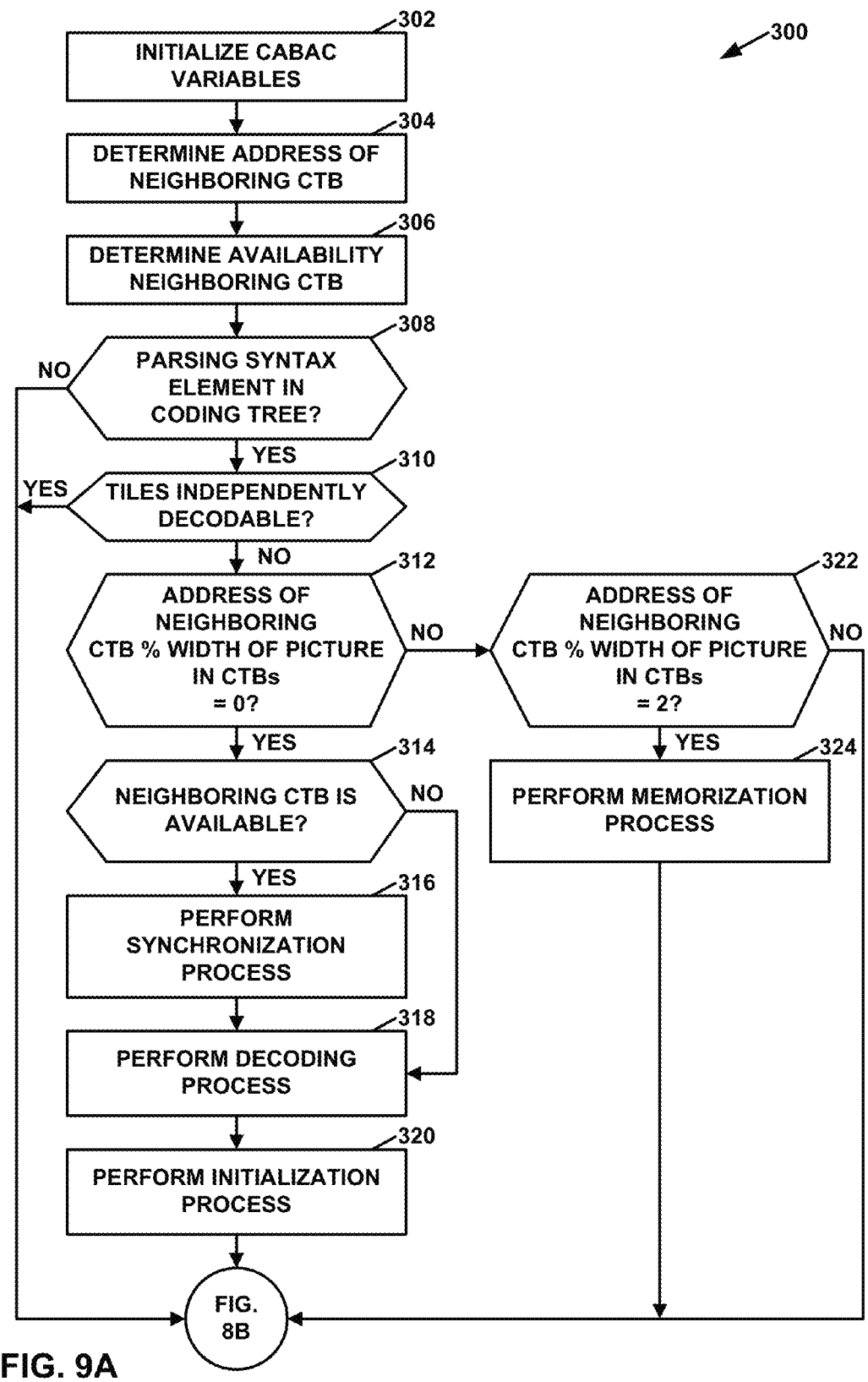
FIG. 9A is a flowchart illustrating a first portion of an example Context-Adaptive Binary Arithmetic Coding (CABAC) parsing process to parse slice data, in accordance with one or more aspects of this disclosure.

FIG. 9A is a flowchart illustrating a first portion of an example CABAC parsing process 300 to parse slice data, in accordance with one or more aspects of this disclosure. Video decoder 30 may perform the process of FIG. 9A when parsing syntax elements with descriptor ae(v) in a slice data and in a coding tree syntax. The process of FIG. 9A may output a value of a syntax element.

In the example of FIG. 9A, entropy decoding unit 150 of video decoder 30 performs an initialization of the CABAC parsing process (302). In some examples, the initialization of the CABAC parsing process is the same as that described in sub-clause 9.2.1 of HEVC WD5.

In addition, entropy decoding unit 150 may determine an address of a neighboring CTB (304). The neighboring CTB may be a CTB that contains a block that neighbors the current CTB (i.e., the CTB that video decoder 30 is currently decoding) to the left, above-left, above, or above-right. In some examples, entropy decoding unit 150 may determine the address of the neighboring CTB as:

$$tbAddrT = cuAddress(x0+2*(1<<\text{Log 2MaxCUSize})-1, y0-1)$$

In the formula above, tbAddrT denotes the address of the neighboring CTB, x0 denotes the x coordinate of a top-left luma sample of the current CTB, y0 denotes the y coordinate of the top-left luma sample of the current CTB, and Log 2MaxCUSize denotes the log, base 2, of the maximum size of a CU. The function cuAddress returns an address of a CU that includes an x coordinate specified by the first parameter and a y coordinate specified by the second parameter.

Next, entropy decoding unit 150 may use the address of the neighboring CTB to determine the availability of the neighboring CTB for in-picture prediction (306). In other words, entropy decoding unit 150 may determine whether information associated with the neighboring CTB is available for use in selecting a CABAC context.

Entropy decoding unit 150 may determine the availability of the neighboring CTB for in-picture prediction in various ways. For example, entropy decoding unit 150 may perform the process described in sub-clause 6.4.3 of WD5, with tbAddrT as input, to determine the availability of the neighboring CTB for in-picture prediction. In another example, entropy decoding unit 150 may determine that a CTB is available for in-picture prediction, unless one of the following conditions is true. If one of the following conditions is true, entropy decoding unit 150 may determine that a CTB is unavailable for in-picture prediction. First, entropy decoding unit 150 may determine that a CTB is unavailable for in-picture prediction if the address of the CTB is less than 0. Second, entropy decoding unit 150 may determine that a CTB is unavailable for in-picture prediction if the address of the CTB is greater than the address of the CTB that entropy decoding unit 150 is currently parsing. Third, entropy decoding unit 150 may determine that a particular CTB is unavailable for in-picture prediction if the particular CTB belongs to a different slice than the CTB that entropy decoding unit 150 is currently parsing. For instance, if the address of the particular CTB is denoted as tbAddr and the address of the CTB that entropy decoding unit 150 is currently parsing is denoted as CurrTbAddr, entropy decoding unit 150 may determine that the CTB with address tbAddr belongs to a different slice than the CTB with address CurrTbAddr. Fourth, entropy decoding unit 150 may determine that a CTB is unavailable for in-picture prediction if one or more syntax elements in the bitstream indicate that the tiles of the picture that video decoder 30 is currently decoding are independently decodable and the CTB is in a different tile than the CTB that entropy decoding unit 150 is currently parsing. For instance, entropy decoding unit 150 may determine that a CTB is unavailable for in-picture prediction if the tile_boundary_independence_flag syntax element of the example syntax of Table 1 is equal to 1 and the CTB with address tbAddr is contained in a different tile than the CTB with address CurrTbAddr.

Furthermore, entropy decoding unit 150 may determine whether the syntax element that entropy decoding unit 150 is currently parsing (i.e., the current syntax element) is in a coding tree syntax structure (308). If the current syntax element is not in a coding tree syntax structure ("NO" of 308), entropy decoding unit 150 may perform the portion of CABAC parsing process 300 shown in FIG. 9B. On the other hand, if the current syntax element is in a coding tree structure ("YES" of 308), entropy decoding unit 150 may determine whether tiles of the current picture (i.e., the picture that includes the current CTB) are independently decodable (310). For instance, in the example SPS syntax of Table 1, entropy decoding unit 150 may determine that the tiles of the current picture are independently decodable if an SPS associated with the current picture includes a tile_boundary_independence_flag syntax element that is equal to 1. In response to determining that the tiles of the current picture are independently decodable ("YES" of 310), entropy decoding unit 150 may perform the portion of CABAC parsing process 300 shown in FIG. 9B.

However, in response to determining that the tiles of the current picture are not independently decodable ("NO" of 310), entropy decoding unit 150 may determine whether tbAddr % picWidthInLCUs is equal to 0, where tbAddr is the address of the neighboring CTB, % denotes the modulo operator, and picWidthInLCUs indicates a width of the current picture in CTBs (i.e., LCUs) (312).

In response to determining that tbAddr % picWidthInLCUs is equal to 0 ("YES" of 312), entropy decoding unit 150 may determine whether the neighboring CTB is available for in-picture prediction (314). In some examples, entropy decoding unit 150 may perform, in action 306, a process to determine a value of a variable availableFlagT that indicates whether the neighboring CTB is available for in-picture prediction. If the variable availableFlagT is equal to 1, the neighboring CTB is available for in-picture prediction. In action 314, entropy decoding unit 150 may determine whether the variable availableFlagT is equal to 1.

In response to determining that the neighboring CTB is available for in-picture prediction ("YES" of 314), entropy decoding unit 150 may perform a synchronization process of the CABAC parsing process (316). In some examples, entropy decoding unit 150 may perform the synchronization process described in sub-clause 9.2.1.3 of HEVC WD5. After performing the synchronization process or in response to determining that the neighboring CTB is not available for in-picture prediction ("NO" of 314), entropy decoding unit 150 may perform a decoding process for binary decisions before termination (318). In general, the decoding process for binary decisions before termination is a special decoding process for entropy decoding the end_of_slice_flag and pcm_flag syntax elements. Video decoder 30 may use the end_of_slice_flag and pcm_flag to make binary decisions before termination of the process of parsing slice data. In some examples, entropy decoding unit 150 may perform the decoding process for binary decisions before termination, as specified in sub-clause 9.2.3.2.4 of HEVC WD5.

After performing the decoding process for binary decisions before termination (318), entropy decoding unit 150 may perform an initialization process for an arithmetic decoding engine (320). In some examples, entropy decoding unit 150 may perform the initialization process defined in sub-clause 9.2.1.4 of HEVC WD5. After performing the initialization process for the arithmetic decoding engine, entropy decoding unit 150 may perform the portion of CABAC parsing process 300 shown in FIG. 9B.

If tbAddr % picWidthInLCUs is not equal to 0 ("NO" of 312), entropy decoding unit 150 may determine whether tbAddr % picWidthInLCUs is equal to 2 (322). In other words, entropy decoding unit 150 may determine whether the CTB address of the neighboring CTB mod the width of the current picture in CTBs is equal to 2. In response to determining that tbAddr % picWidthInLCUs is not equal to 2, entropy decoding unit 150 may perform the portion of CABAC parsing process 300 shown in FIG. 9B. However, in response to determining that tbAddr % picWidthInLCUs is equal to 2 ("YES" of 322), entropy decoding unit 150 may perform a memorization process (324). In general, the memorization process outputs variables used in the initialization process of context variables that are assigned to syntax elements other than the end_of_slice_flag syntax element. In some examples, entropy decoding unit 150 may perform the memorization process defined in sub-clause 9.2.1.2 of HEVC WD5. After performing the memorization process, entropy decoding unit 150 may perform the portion of CABAC parsing process 300 shown in FIG. 9B.

Figure 9B:
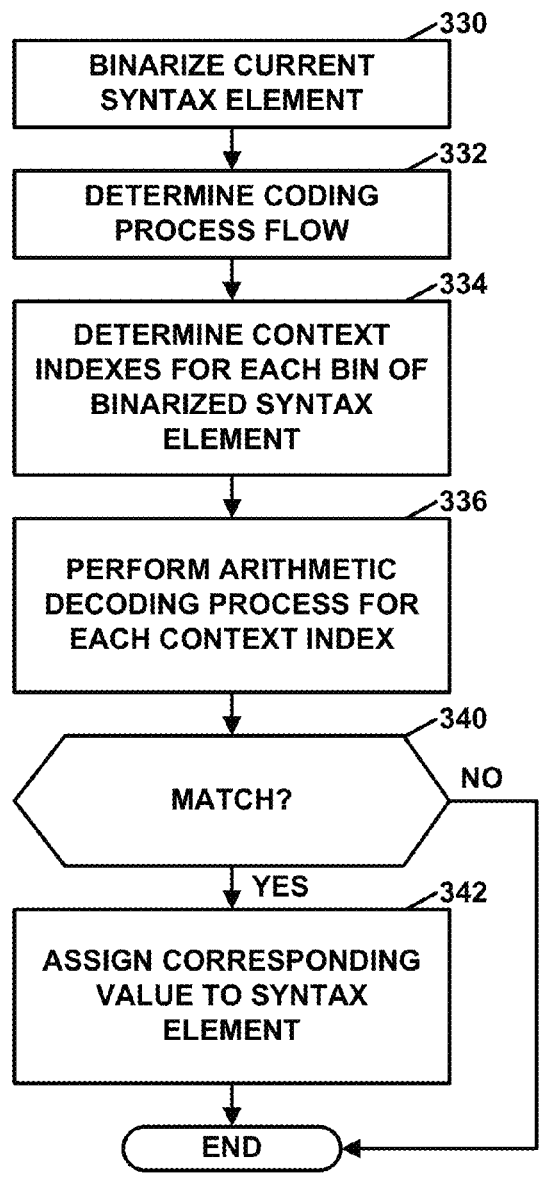
FIG. 9B is a flowchart illustrating a continuation of the example CABAC parsing process of FIG. 9A.

FIG. 9B is a flowchart illustrating a continuation of the example CABAC parsing process 300 of FIG. 9A. As shown in FIG. 9B, entropy decoding unit 150 may binarize the current syntax element (330). In other words, entropy decoding unit 150 may derive a binarization of the current syntax element. The binarization of a syntax element may be a set of bin strings for all possible values of the syntax element. A bin string is a string of bins that is an intermediate representation of values of syntax elements from the binarization of the syntax element. In some examples, entropy decoding unit 150 may perform the process defined in sub-clause 9.2.2 of HEVC WD5 to derive the binarization of the current syntax element.

In addition, entropy decoding unit 150 may determine coding process flow (332). Entropy decoding unit 150 may determine the coding process flow based on the binarization of the current syntax element and the sequence of parsed bins. In some examples, entropy decoding unit 150 may determine the coding process flow as described in sub-clause 9.2.2.9 of HEVC WD5.

Furthermore, entropy decoding unit 150 may determine a context index for each bin of the binarization of the current syntax element (334). Each of the bins of the binarization of the current syntax element is indexed by the variable binIdx and the context index for a bin of the binarization of the current syntax element may be denoted as ctxIdx. In some examples, entropy decoding unit 150 may determine the context index for a bin of the binarization of the current syntax element as specified in sub-clause 9.2.3.1 of HEVC WD5.

Entropy decoding unit 150 may perform an arithmetic decoding process for each context index (336). In some examples, entropy decoding unit 150 may perform the arithmetic decoding process for each context index as specified in sub-clause 9.2.3.2 of HEVC WD5. By performing the arithmetic decoding process for each context index, entropy decoding unit 150 may generate a sequence of parsed bins.

Entropy decoding unit 150 may determine whether the sequence of parsed bins matches a bin string in the set of bin strings produced by the binarization of the current syntax element (340). If the sequence of parsed bins matches a bin string in the set of bin strings produced by the binarization of the current syntax element ("YES" of 340), entropy decoding unit 150 may assign a corresponding value to the current syntax element (342). After assigning the corresponding value to the current syntax element or in response to determining that the sequence of parsed bins does not match any bin string in the set of bin strings produced by the binarization of the current syntax element ("NO" of 340), entropy decoding unit 150 has finished parsing the current syntax element.

In some examples, if the current syntax element is the mb_type syntax element and the decoded value of the mb_type syntax element is equal to I_PCM, entropy decoding unit 150 may be initialized after decoding any pcm_alignment_zero_bit syntax element and all pcm_sample_luma and pcm_sample_chroma data as specified in sub-clause 9.2.1.2 of HEVC WD5.

FIG. 10 is a conceptual diagram that illustrates an example of WPP. As described above, a picture may be partitioned into pixel blocks, each of which is associated a CTB. FIG. 10 illustrates the pixel blocks associated with the CTBs as a grid of white squares. The picture includes CTB rows 350A-350E (collectively, "CTB rows 350").

A first parallel processing thread (e.g., executed by one of a plurality of parallel processing cores) may be coding CTBs in CTB row 350A. Concurrently, other threads (e.g., executed by other parallel processing cores) may be coding CTBs in CTB rows 350B, 350C, and 350D. In the example of FIG. 10, the first thread is currently coding a CTB 352A, a second thread is currently coding a CTB 352B, a third thread is currently coding a CTB 352C, and a fourth thread is currently coding a CTB 352D. This disclosure may refer to CTBs 352A, 352B, 352C, and 352D collectively as "current CTBs 352." Because the video coder may begin coding a CTB row after more than two CTBs of an immediately higher row have been coded, current CTBs 352 are horizontally displaced from each other by the widths of two CTBs.

In the example of FIG. 10, the threads may use data from CTBs indicated by the thick gray arrows to perform intra prediction or inter prediction for CUs in current CTBs 352. (The threads may also use data from one or more reference frames to perform inter prediction for CUs.) To code a given CTB, a thread may select one or more CABAC contexts based on information associated with previously-coded CTBs. The thread may use the one or more CABAC contexts to perform CABAC coding on syntax elements associated with the first CU of the given CTB. If the given CTB is not the leftmost CTB of a row, the thread may select the one or more CABAC contexts based on information associated with a last CU of the CTB to the left of the given CTB. If the given CTB is the leftmost CTB of a row, the thread may select the one or more CABAC contexts based on information associated with a last CU of a CTB that is above and two CTBs right of the given CTB. The threads may use data from the last CUs of the CTBs indicated by the thin black arrows to select CABAC contexts for the first CUs of current CTBs 352.

Figure 11:
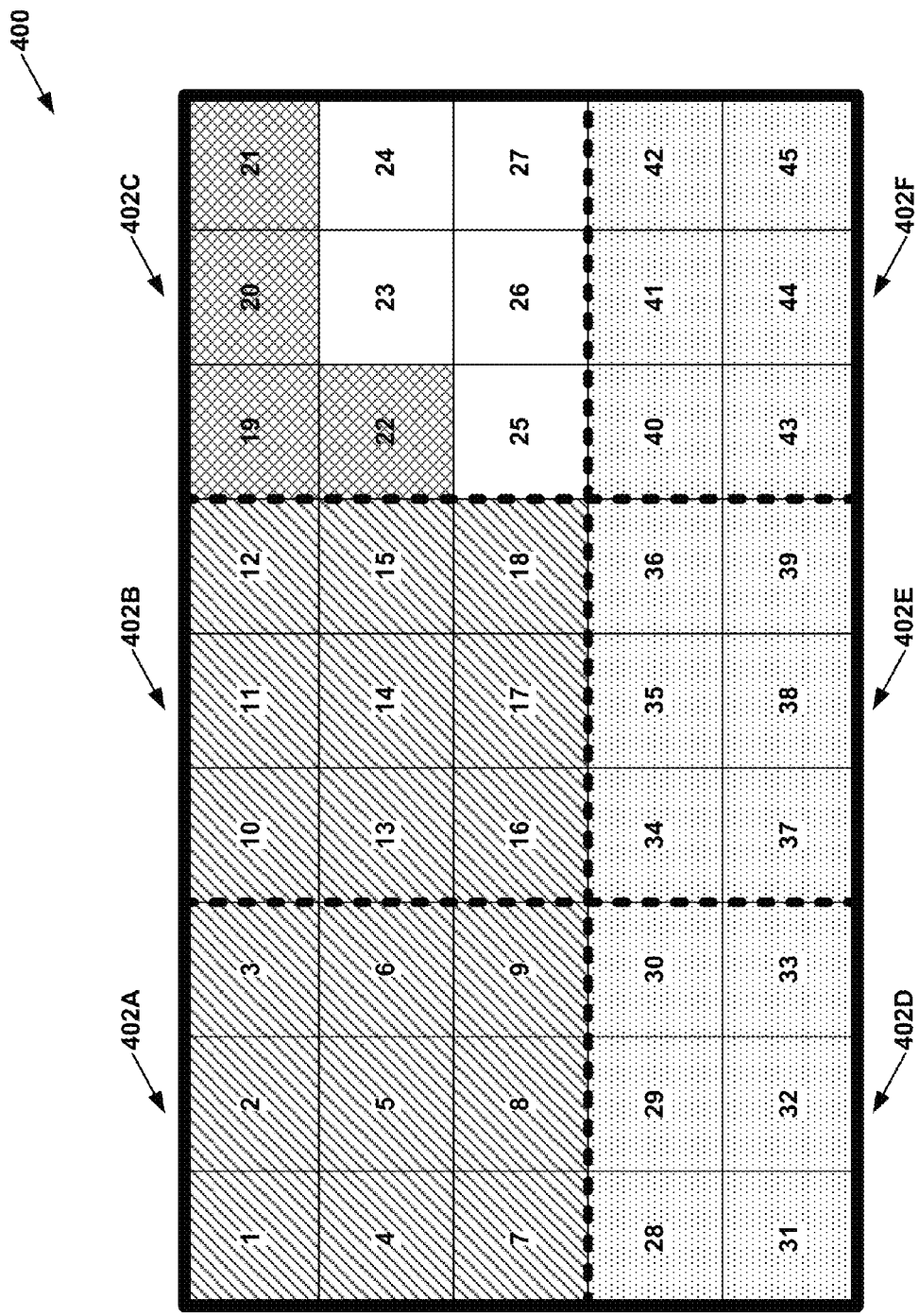
FIG. 11 is a conceptual diagram that illustrates an example coding order when a picture is partitioned into a plurality of tiles.

FIG. 11 is a conceptual diagram that illustrates an example CTB coding order for a picture 400 that is partitioned into multiple tiles 402A, 402B, 402C, 402D, 402E, and 402F (collectively, "tiles 402"). Each square block in picture 400 represents a pixel block associated with a CTB. The thick dashed lines indicate example tile boundaries. Different types of cross-hatching correspond to different slices.

The numbers in the pixel blocks indicate positions of the corresponding CTBs (LCUs) in a tile coding order for picture 400. As illustrated in the example of FIG. 11, CTBs in tile 402A are coded first, followed by CTBs in tile 402B, followed by CTBs in tile 402C, followed by CTBs in tile 402D, followed by CTBs in tile 402E, followed by CTBs in tile 402F. Within each of tiles 402, the CTBs are coded according to a raster scan order.

A video encoder may generate four coded slice NAL units for picture 400. The first coded slice NAL unit may include encoded representations of CTBs 1-18. The slice data of the first coded slice NAL unit may include two sub-streams. The first sub-stream may include the encoded representations of CTBs 1-9. The second sub-stream may include the encoded representations of CTBs 10-18. Thus, the first coded slice NAL unit may include an encoded representation of a slice that contains multiple tiles.

A second coded slice NAL unit may include encoded representations of CTBs 19-22. The slice data of the second coded slice NAL unit may include a single sub-stream. A third coded slice NAL unit may include encoded representations of CTBs 23-27. The slice data of the third coded slice NAL unit may include only a single sub-stream. Thus, tile 402C may contain multiple slices.

A fourth coded slice NAL unit may include encoded representations of CTBs 28-45. The slice data of the fourth coded slice NAL unit may include three sub-streams, one each for tiles 402D, 402E, and 402F. Thus, the fourth coded slice NAL unit may include an encoded representation of a slice that contains multiple tiles.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for decoding video data, the method comprising:
   parsing a syntax element from a bitstream, the bitstream including a coded slice Network Abstraction Layer (NAL) unit for a slice of a picture of the video data that is partitioned into coding tree blocks (CTBs), each of the CTBs being associated with a different equally sized block of pixels within the picture, the coded slice NAL unit including a plurality of sub-streams, the syntax element having a particular value indicating each respective row of CTBs of the picture forms a respective tile of the picture, wherein each respective sub-stream of the plurality of sub-streams contains all encoded bits of a respective tile of the picture, a number of ending encoded bits of the respective tile, or starting encoded bits of the respective tile, and none of the sub-streams contains encoded bits of more than one tile of the picture;
   determining, based on the syntax element, whether the sub-streams include padding bits that ensure byte alignment of the sub-streams; and
   in response to determining that the syntax element has the particular value, decoding each tile of the picture using wavefront parallel processing (WPP),
   wherein the syntax element not having the particular value indicates each tile of the picture is decoded without using WPP.

2. The method of claim 1, further comprising parsing, from the bitstream, a picture parameter set that includes the syntax element.

3. The method of claim 1, further comprising parsing, from the bitstream, a sequence parameter set that includes the syntax element.

4. The method of claim 1, further comprising:
parsing a second syntax element from the bitstream, the bitstream including a coded representation of a second picture of the video data, the second picture being partitioned into CTBs, wherein the second picture is partitioned into at least a first tile and a second tile; and
in response to determining that the second syntax element does not have the particular value, decoding, in parallel, a CTB of the first tile and a CTB of the second tile.

5. The method of claim 1, further comprising:
determining that a parameter set includes a tile column number syntax element and a tile row number syntax element;
determining, based on the tile column number syntax element, a specified number of tile columns, wherein a number of columns of tiles of each picture associated with the parameter set is equal to the specified number of tile columns; and
determining, based on the tile row number syntax element, a specified number of tile rows, wherein a number of rows of tiles of each picture associated with the parameter set is equal to the specified number of tile rows.

6. The method of claim 1, wherein the syntax element is a first syntax element, the particular value is a first value, and the first syntax element having a second value indicates that the picture includes only one tile and that the bitstream includes a second syntax element, the second syntax element indicating whether entropy slices are enabled for encoded representations of the pictures that refer to a parameter set that includes the first and second syntax elements.

7. The method of claim 1, wherein the coded slice NAL unit comprises a slice header and slice data, and the method further comprises:
determining, based at least in part on the syntax element, whether the slice header includes a plurality of offset syntax elements; and
in response to determining that the slice header includes the plurality of offset syntax elements, using the plurality of offset syntax elements to determine entry points of sub-streams in the slice data.

8. The method of claim 1, wherein decoding the picture using WPP comprises:
in response to determining that a first CTB is separated from a left boundary of the picture by a single CTB, storing context variables associated with the first CTB; and
entropy decoding, based at least in part on the context variables associated with the first CTB, one or more syntax elements of a second CTB, the second CTB being adjacent to the left boundary of the picture and one row of CTBs lower than the first CTB.

9. A method for encoding video data, the method comprising;
generating, in a bitstream, a coded slice Network Abstraction Layer (NAL) unit for a slice of a picture of the video data that is partitioned into coding tree blocks (CTBs), each of the CTBs being associated with a different equally sized block of pixels within the picture, the coded slice NAL unit including a plurality of sub-streams; and
generating a syntax element in the bitstream, wherein the syntax element having a particular value indicates each respective row of CTBs of the picture forms a respective tile of the picture, the sub-streams include padding bits that ensure byte alignment of the sub-streams, and each tile of the picture is encoded using wavefront parallel processing (WPP),
wherein each respective sub-stream of the plurality of sub-streams contains all encoded bits of a respective tile of the picture, a number of ending encoded bits of the respective tile, or starting encoded bits of the respective tile, and none of the sub-streams contains any encoded bits of more than one tile of the picture, wherein the syntax element not having the particular value indicates each tile of the picture is encoded without using WPP.

10. The method of claim 9, wherein generating the bitstream comprises generating a picture parameter set that includes the syntax element.

11. The method of claim 9, wherein generating the bitstream comprises generating a sequence parameter set that includes the syntax element.

12. The method of claim 9, further comprising:
including a second syntax element in the bitstream, the bitstream including a coded representation of a second picture of the video data, the second picture being partitioned into CTBs, the second syntax element not having the particular value, wherein the second picture is partitioned into at least a first tile and a second tile; and
encoding, in parallel, a coding tree block (CTB) of the first tile and a CTB of the second tile.

13. The method of claim 9, wherein:
generating the bitstream comprises generating a parameter set that includes a tile column number syntax element and a tile row number syntax element,
the number of tile columns is determinable based on the tile column number syntax element and the number of columns of tiles of each picture associated with the parameter set is equal to the number of tile columns, and
the number of tile rows is determinable based on the tile row number syntax element and the number of rows of tiles of each picture associated with the parameter set is equal to the number of tile rows.

14. The method of claim 9, wherein the syntax element is a first syntax element, the particular value is a first value, the syntax element having a second value indicating the picture is partitioned into a single tile and the bitstream includes a second syntax element, the second syntax element indicating whether entropy slices are enabled for encoded representation of the pictures that refer to a parameter set that includes the first and second syntax elements.

15. The method of claim 9, wherein the coded slice NAL unit comprises a slice header and slice data, and the slice header includes a plurality of offset syntax elements from which entry points of sub-streams in the slice data are determinable.

16. The method of claim 9, further comprising using WPP to encode each tile of the picture, wherein using WPP to encode each tile of the picture comprises:
in response to determining that a first CTB is separated from a left boundary of the picture by a single CTB, storing context variables associated with the first CTB; and
entropy encoding, based at least in part on the context variables associated with the first CTB, one or more syntax elements of a second CTB, the second CTB being adjacent to the left boundary of the picture and one row of CTBs lower than the first CTB.

17. A video decoding device that comprises:
a data storage medium configured to store video data; and
one or more processors configured to:

parse a syntax element from a bitstream, the bitstream including a coded slice Network Abstraction Layer (NAL) unit for a slice of a picture of the video data that is partitioned into coding tree blocks (CTBs), each of the CTBs being associated with a different equally sized block of pixels within the picture, the coded slice NAL unit including a plurality of sub-streams, the syntax element having a particular value indicating each respective row of CTBs of the picture forms a respective tile of the picture, wherein each respective sub-stream of the plurality of sub-streams contains all encoded bits of a respective tile of the picture, a number of ending encoded bits of the respective tile, or starting encoded bits of the respective tile, and none of the sub-streams contains encoded bits of more than one tile of the picture;

determine, based on the syntax element, whether the sub-streams include padding bits that ensure byte alignment of the sub-streams; and in response to determining that the syntax element has the particular value, decode each tile of the picture using wavefront parallel processing (WPP), wherein the syntax element not having the particular value indicates each tile of the picture is decoded without using WPP.

18. The video decoding device of claim 17, wherein the one or more processors are configured to parse, from the bitstream, a picture parameter set that includes the syntax element.

19. The video decoding device of claim 17, wherein the one or more processors are configured to parse, from the bitstream, a sequence parameter set that includes the syntax element.

20. The video decoding device of claim 17, wherein the one or more processors are further configured to:

parse a second syntax element from the bitstream, the bitstream including a coded representation of a second picture of the video data, the second picture being partitioned into CTBs, wherein the second picture is partitioned into at least a first tile and a second tile, and in response to determining that the second syntax element does not have the particular value, decode, in parallel, a CTB of the first tile and a CTB of the second tile.

21. The video decoding device of claim 17, wherein the one or more processors are further configured to:

determine that a parameter set includes a tile column number syntax element and a tile row number syntax element;

determine, based on the tile column number syntax element, a specified number of tile columns, wherein a number of columns of tiles of each picture associated with the parameter set is equal to the specified number of tile columns; and determine, based on the tile row number syntax element, a specified number of tile rows, wherein a number of rows of tiles of each picture associated with the parameter set is equal to the specified number of tile rows.

22. The video decoding device of claim 17, wherein the syntax element is a first syntax element, the particular value is a first value, and the first syntax element having a second value indicates that the picture includes only one tile and that the bitstream includes a second syntax element, the second syntax element indicating whether entropy slices are enabled for encoded representations of the pictures that refer to a parameter set that includes the first and second syntax elements.

23. The video decoding device of claim 17, wherein the coded slice NAL unit comprises a slice header and slice data, and the one or more processors are further configured to:

determine, based at least in part on the syntax element, whether the slice header includes a plurality of offset syntax elements; and in response to determining that the slice header includes the plurality of offset syntax elements, use the plurality of offset syntax elements to determine entry points of sub-streams in the slice data.

24. The video decoding device of claim 17, wherein when the one or more processors use WPP to decode the tiles of the picture, the one or more processors:

in response to determining that a first CTB is separated from a left boundary of the picture by a single CTB, store context variables associated with the first CTB; and entropy decode, based at least in part on the context variables associated with the first CTB, one or more syntax elements of a second CTB, the second CTB being adjacent to the left boundary of the picture and one row of CTBs lower than the first CTB.

25. The video decoding device of claim 17, wherein the video decoding device comprises at least one of:
an integrated circuit;
a microprocessor; or
a wireless communication device.

26. The video decoding device of claim 17, further comprising a display configured to display the decoded video data.

27. A video encoding device comprising:
a data storage medium configured to store video data; and
one or more processors configured to:
generate, in a bitstream, a coded slice Network Abstraction Layer (NAL) unit for a slice of a picture of the video data that is partitioned into coding tree blocks (CTBs), each of the CTBs being associated with a different equally sized block of pixels within the picture, the coded slice NAL unit including a plurality of sub-streams;

generate a syntax element in the bitstream wherein the syntax element having a particular value indicates each respective each row of CTBs of the picture forms a respective tile of the picture, the sub-streams include padding bits that ensure byte alignment of the sub-streams, and each tile of the picture is encoded using wavefront parallel processing (WPP), wherein each respective sub-stream of the plurality of sub-streams contain all encoded bits of a respective tile of the picture, a number of ending encoded bits of the respective tile, or starting encoded bits of the respective tile, and none of the sub-streams contains any encoded bits of more than one tile of the picture, wherein the syntax element not having the particular value indicates each tile of the picture is encoded without using WPP.

28. The video encoding device of claim 27, wherein the one or more or processors are configured to generate a picture parameter set that includes the syntax element.

29. The video encoding device of claim 27, wherein the one or more processors are configured to generate a sequence parameter set that includes the syntax element.

30. The video encoding device of claim 27, wherein the one or more processors are further configured to:

include a second syntax element in the bitstream, the bitstream including a coded representation of a second picture of the video data, the second picture being partitioned into CTBs, the second syntax element not having the particular value, wherein the second picture is partitioned into at least a first tile and a second tile; and encode, in parallel, a coding tree block (CTB) of the first tile and a CTB of the second tile.

31. The video encoding device of claim 27, wherein:
the one or more processors are configured to generate a parameter set that includes a tile column number syntax element and a tile row number syntax element,
the number of tile columns is determinable based on the tile column number syntax element and the number of columns of tiles of each picture associated with the parameter set is equal to the number of tile columns, and
the number of tile rows is determinable based on the tile row number syntax element and the number of rows of tiles of each picture associated with the parameter set is equal to the number of tile rows.

32. The video encoding device of claim 27, wherein the syntax element is a first syntax element, the particular value is a first value, the syntax element having a second value indicating the picture is partitioned into a single tile and the bitstream includes a second syntax element, the second syntax element indicating whether entropy slices are enabled for encoded representation of the pictures that refer to a parameter set that includes the first and second syntax elements.

33. The video encoding device of claim 27, wherein the coded slice NAL unit comprises a slice header and slice data, and the slice header includes a plurality of offset syntax elements from which entry points of sub-streams in the slice data are determinable.

34. The video encoding device of claim 27, wherein when the one or more processors use WPP to encode the CTBs of each tile of the picture, the one or more processors:
in response to determining that a first CTB is separated from a left boundary of the picture by a single CTB, store context variables associated with the first CTB; and
entropy encode, based at least in part on the context variables associated with the first CTB, one or more syntax elements of a second CTB, the second CTB being adjacent to the left boundary of the picture and one row of CTBs lower than the first CTB.

35. The video encoding device of claim 27, wherein the video encoding device comprises at least one of:
an integrated circuit;
a microprocessor; or
a wireless communication device.

36. The video encoding device of claim 27, further comprising a camera configured to capture the video data.

37. A video decoding device that comprises:
means for parsing a syntax element from a bitstream, the bitstream including a coded slice Network Abstraction Layer (NAL) unit for a slice of a picture of video data that is partitioned into coding tree blocks (CTBs), each of the CTBs being associated with a different equally sized block of pixels within the picture, the coded slice NAL unit including a plurality of sub-streams, the syntax element having a particular value indicating each respective row of CTBs of the picture forms a respective tile of the picture, wherein each respective sub-stream of the plurality of sub-streams contains all encoded bits of a respective tile of the picture, a number of ending encoded bits of the respective tile, or starting encoded bits of the respective tile, and none of the sub-streams contains encoded bits of more than one tile of the picture;
means for determining, based on the syntax element, whether the sub-streams include padding bits that ensure byte alignment of the sub-streams; and
means for decoding, in response to determining that the syntax element has the particular value, each tile of the picture using wavefront parallel processing (WPP),
wherein the syntax element not having the particular value indicates each tile of the picture is decoded without using WPP.

38. A video encoding device that comprises:
means for generating, in a bitstream, a coded slice Network Abstraction Layer (NAL) unit for a slice of a picture of video data that is partitioned into a grid of coding tree blocks (CTBs), each of the CTBs being associated with a different equally sized block of pixels within the picture, the coded slice NAL unit including a plurality of sub-streams; and
means for generating a syntax element in the bitstream, wherein the syntax element having a particular value indicates each respective row of CTBs of the picture forms a respective tile of the picture, the sub-streams include padding bits that ensure byte alignment of the sub-streams, and each tile of the picture is encoded using wavefront parallel processing (WPP),
wherein each respective sub-stream of the plurality of sub-streams contains all encoded bits of a respective tile of the picture, a number of ending encoding bits of the respective tile, or starting encoded bits of the respective tile, and none of the sub-streams contains any encoded bits of more than one tile of the picture, wherein the syntax element not having the particular value indicates each tile of the picture is encoded without using WPP.

39. A non-transitory computer-readable storage medium that stores instructions that, when executed by one or more processors of a video decoding device, configure the video decoding device to:
parse a syntax element from a bitstream, the bitstream including a coded slice Network Abstraction Layer (NAL) unit for a slice of a picture of video data that is partitioned into coding tree blocks (CTBs), each of the CTBs being associated with a different equally sized block of pixels within the picture, the coded slice NAL unit including a plurality of sub-streams, the syntax element having a particular value indicating each respective row of CTBs of the picture forms a respective tile of the picture, wherein each respective sub-stream of the plurality of sub-streams contains all encoded bits of a respective tile of the picture, a number of ending encoded bits of the respective tile, or starting encoded bits of the respective tile, and none of the sub-streams contains encoded bits of more than one tile of the picture;
determine, based on the syntax element, whether the sub-streams include padding bits that ensure byte alignment of the sub-streams; and
in response to determining that the syntax element has the particular value, decode each tile of the picture using wavefront parallel processing (WPP),
wherein the syntax element not having the particular value indicates each tile of the picture is decoded without using WPP.

40. A non-transitory computer-readable storage medium that stores instructions that, when executed by one or more processors of a video encoding device, configure the video encoding device to:
generate, in a bitstream, a coded slice Network Abstraction Layer (NAL) unit for a slice of a picture of video data that is partitioned into coding tree blocks (CTBs), each of the CTBs being associated with a different equally sized block of pixels within the picture, the coded slice
NAL unit including a plurality of sub-streams; and
generate a syntax element in the bitstream, wherein the
syntax element having a particular value indicates each
respective row of CTBs of the picture forms a respective
tile of the picture, the sub-streams include padding bits
that ensure byte alignment of the sub-streams, and each
tile of the picture is encoded using wavefront parallel
processing (WPP),
wherein each respective sub-stream of the plurality of sub-streams contains all encoded bits of a respective tile of
the picture, a number of ending encoded bits of the
respective tile, or starting encoded bits of the respective
tile, and none of the sub-streams contains any encoded
bits of more than one tile of the picture, wherein the
syntax element not having the particular value indicates
each tile of the picture is encoded without using WPP.

* * * * *